(12) United States Patent
Nickolls et al.

(10) Patent No.: US 7,680,988 B1
(45) Date of Patent: Mar. 16, 2010

(54) SINGLE INTERCONNECT PROVIDING READ AND WRITE ACCESS TO A MEMORY SHARED BY CONCURRENT THREADS

(75) Inventors: John R. Nickolls, Los Altos, CA (US); Brett W. Coon, San Jose, CA (US); Ming Y. Siu, Santa Clara, CA (US); Stuart F. Oberman, Sunnyvale, CA (US); Samuel Liu, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 333 days.

(21) Appl. No.: 11/554,563

(22) Filed: Oct. 30, 2006

(51) Int. Cl.
*G06F 13/16* (2006.01)
(52) U.S. Cl. .................. 711/149; 711/130; 711/131
(58) Field of Classification Search ........... 711/130, 711/147–150, 167–169; 707/8; 712/22
See application file for complete search history.

(56) References Cited

U.S. PATENT DOCUMENTS

| | | | |
|---|---|---|---|
| 4,128,875 A | | 12/1978 | Thurber et al. |
| 5,109,514 A | * | 4/1992 | Garner et al. ............... 710/260 |
| 5,355,508 A | | 10/1994 | Kan |
| 5,504,678 A | * | 4/1996 | Juszczak et al. ............... 702/14 |
| 5,592,628 A | | 1/1997 | Ueno et al. |
| 5,678,062 A | * | 10/1997 | Okada et al. .................. 710/22 |
| 5,740,402 A | | 4/1998 | Bratt et al. |
| 6,205,519 B1 | * | 3/2001 | Aglietti et al. .............. 711/133 |
| 6,324,623 B1 | | 11/2001 | Carey |
| 6,779,049 B2 | | 8/2004 | Altman et al. |
| 6,839,828 B2 | | 1/2005 | Gschwind |
| 6,897,871 B1 | | 5/2005 | Morein et al. |
| 6,918,044 B1 | * | 7/2005 | Robins et al. .................. 726/5 |
| 7,038,685 B1 | | 5/2006 | Lindholm |
| 7,412,586 B1 | * | 8/2008 | Rajopadhye et al. .......... 712/10 |
| 2002/0062352 A1 | * | 5/2002 | Asano et al. ................. 709/212 |
| 2002/0107990 A1 | * | 8/2002 | Johnson et al. ............. 709/250 |
| 2002/0174318 A1 | | 11/2002 | Stuttard et al. |
| 2002/0196669 A1 | * | 12/2002 | Hsu et al. .............. 365/189.04 |
| 2003/0196030 A1 | | 10/2003 | Elliott et al. |
| 2004/0181503 A1 | * | 9/2004 | Moseler et al. ................ 707/1 |
| 2005/0149602 A1 | * | 7/2005 | Venkatachalam et al. ... 709/200 |
| 2005/0226079 A1 | | 10/2005 | Zhu et al. |
| 2005/0251644 A1 | | 11/2005 | Maher et al. |
| 2006/0143415 A1 | * | 6/2006 | Naik .......................... 711/163 |

(Continued)

OTHER PUBLICATIONS

Cell Microprocessor www.wikipedia.org, downloaded at.

(Continued)

*Primary Examiner*—Matt Kim
*Assistant Examiner*—Michael C Krofcheck
(74) *Attorney, Agent, or Firm*—Townsend and Townsend and Crew LLP

(57) ABSTRACT

A shared memory is usable by concurrent threads in a multi-threaded processor, with any addressable storage location in the shared memory being readable and writeable by any of the threads. Processing engines that execute the threads are coupled to the shared memory via an interconnect that transfers data in only one direction (e.g., from the shared memory to the processing engines); the same interconnect supports both read and write operations. The interconnect advantageously supports multiple parallel read or write operations.

21 Claims, 13 Drawing Sheets

U.S. PATENT DOCUMENTS

2007/0013702 A1  1/2007  Hiroi et al.
2007/0033369 A1* 2/2007  Kasama et al. ............... 711/170
2009/0106524 A1  4/2009  Chen et al.

OTHER PUBLICATIONS

Cell Architecture Explained Version 2, Introduction and Index, downloaded at http://www.blachford.info/computer/Cell/Cell0_v2.html on Feb. 7, 2007.

Eggers et al. "Simultaneous multithreading: a platform for next-generation processors" IEEE Micro, Sep./Oct. 1997 (vol. 17, No. 5) pp. 12-19.

Gschwind et al. "Synergistic Processing in Cell's Multicore Architecture", IEEE Computer Society, vol. 26, Issue 2 (Mar. 2006) pp. 10-24.

Marr et al. "Hyper-Threading Technology Architecture and Microarchitecture", Intel Technology Journal, vol. 6 Issue 1 Published Feb. 14, 2002.

Office Action dated Dec. 8, 2008, U.S. Appl. No. 11/554,552, filed Oct. 30, 2006, 15 pages.

Office Action dated Jun. 3, 2009, U.S. Appl. No. 11/554,552, filed Oct. 30, 2006, 14 pages.

U.S. Appl. No. 11/554,542, filed Jul. 17, 2009, 8 pages.

U.S Appl. No. 11/554,546, filed Aug. 5, 2009, 12 pages.

U.S. Appl. No. 11/554,552, filed Oct. 14, 2009, 15 pages.

U.S. Appl. No. 11/554,542, Office Action dated Dec. 8, 2009, 9 pages.

* cited by examiner

SINGLE INTERCONNECT PROVIDING READ AND WRITE ACCESS TO A MEMORY SHARED BY CONCURRENT THREADS

CROSS-REFERENCES TO RELATED APPLICATIONS

The present disclosure is related to the following commonly-assigned co-pending U.S. Patent Applications: application Ser. No. 11/554,552, filed of even date herewith, entitled "Shared Memory For Concurrent Threads in a Multithreaded Processor Core"; application Ser. No. 11/554,546, filed of even date herewith, entitled "Parallel Access and Access Conflict Resolution Mechanism"; and application Ser. No. 11/305,178, filed Dec. 15, 2005, entitled "Parallel Data Processing Systems and Methods Using Cooperative Thread Arrays." The respective disclosures of these applications are incorporated herein by reference for all purposes.

BACKGROUND OF THE INVENTION

The present invention relates in general to multithreaded processor systems and in particular to a memory that can be shared by concurrent threads with a single interconnect that provides both read and write access to the shared memory.

Parallel processing computer systems, including processors that can manage multiple concurrent threads, are known in the art. For large processing tasks, parallel processing can speed throughput by enabling the computer system to work on multiple independent parts of the processing task at once. For example, in graphics processors, each vertex or pixel is typically processed independently of all other vertices or pixels. Accordingly, graphics processors are usually designed with a large number of parallel processing pipelines for vertices and for pixels, allowing many vertices and/or pixels to be processed in parallel threads, which accelerates rendering of an image. The graphics pipelines usually do not share data with each other, apart from state parameters (also referred to as constants) that are usually common to large groups of vertex threads or pixel threads. The constants are usually stored in on-chip registers to which the pipelines have read access; any required updating of constants is handled via a separate control path.

For other types of processing tasks, it is sometimes desirable to allow different threads to share data. For instance, multiple threads may operate on different, overlapping parts of an input data set. As another example, it may be desirable for one thread to consume data produced by another thread. Sharing of data is usually managed by allowing multiple threads to access a common set of memory locations.

Existing shared memory systems tend to have significant overhead. In one model, shared memory is located on a separate chip from the parallel processors. Because the shared memory is off-chip, access is relatively slow. Further, semaphores or the like are typically used to prevent conflicting access requests so that, in effect, only one thread at a time has access to the shared memory. In another model, each processor in a multiprocessor parallel system maintains its own cached copy of all or part of the shared memory. Keeping the caches coherent, however, can incur considerable overhead.

It would therefore be desirable to provide a shared memory subsystem with low latency and support for multiple parallel access operations.

BRIEF SUMMARY OF THE INVENTION

Embodiments of the present invention relate to a shared memory usable by concurrent threads in a multithreaded processor, in which any addressable storage location is readable and writeable by any of the threads. Processing engines that execute the threads are coupled to the shared memory via an interconnect that transfers data in only one direction (e.g., from the shared memory to the processing engines); the same interconnect supports both read and write operations. The interconnect advantageously supports multiple parallel read or write operations. The single-direction data interconnect can reduce chip area and power consumption as compared to providing separate read and write interconnects. In some embodiments, the shared memory is accessed as a shared cache memory (through associative tag lookup); in others, locations in the shared memory are accessed directly by address. Accordingly, the term "shared memory" as used herein is to be understood as including cache memory as well as directly accessed memory.

According to one aspect of the present invention, a processor core includes a shared memory having addressable storage locations, a number of processing engines and an interconnect circuit. The processing engines are each adapted to execute a different thread of a group of threads in parallel. Each thread of the group of threads includes at least one instruction that, when executed, results in an access to a target one of the addressable storage locations in the shared memory. The interconnect circuit couples the processing engines to the shared memory such that any one of the addressable storage locations in the shared memory is readable and writeable by any one of the processing engines. The interconnect circuit is advantageously adapted such that data is transferred through the interconnect circuit in a same direction during both read operations and write operations. For instance, in some embodiments, data moves through the interconnect circuit in a direction from the shared memory to the processing engines during both read operations and write operations.

In some embodiments, the shared memory includes a plurality of banks. The interconnect circuit may include a data interconnect (e.g., a crossbar circuit) adapted to deliver data from the plurality of banks in parallel to more than one of the processing engines, and the data interconnect can be further adapted to selectably transfer data received from any one of the banks to any one of the processing engines. In some embodiments, the processor core also includes an address interconnect circuit (e.g., a crossbar circuit) adapted to deliver respective target address in parallel from different ones of the plurality of processing engines to different ones of the plurality of banks; a target address from any one of the plurality of processing engines is advantageously deliverable to any one of the banks.

In some embodiments where the shared memory includes multiple banks, the processor core also includes a number of local register file lanes, each local register file lane being assigned to a different one of the processing engines. A first write path couples a surrogate one of the processing engines to deliver write data to a first one of the banks. During a write operation, the interconnect circuit is configurable to deliver data associated with a write request targeting a location in the first one of the banks from the local register file lane associated with a source one of the processing engines to the surrogate one of the processing engines. A number of write paths equal to the number of banks can be provided, and each write path advantageously couples a different one of the banks to receive write data from one of the processing engines: Where the number of banks is equal to the number of processing engines, each write path may couple a different one of the processing engines to a different one of the banks.

In some embodiments where the number of banks in the shared memory is equal to the number of processing engines and where each bank is associated with a different one of the processing engines, the processing core further includes read selection circuits and write steering circuits. Each read selection circuit is coupled to receive data from a respective one of the local register file lanes and from a respective one of the banks of the shared memory, and each read selection circuit is adapted to select between received data from the local register file lane and received data from the shared memory bank. Each read selection circuit is also adapted to deliver the selected data to a respective input of the data crossbar. Each of the write steering circuits is coupled to receive data from a respective one of the processing engines and is adapted to steer the received data selectably to either the local register file lane assigned to the respective one of the processing engines or the one of the banks of the shared memory associated with the respective one of the processing engines.

According to another aspect of the present invention, a method of writing data to a shared memory in a processor having multiple processing engines operable in parallel includes identifying a write-source location for write data. The write-source location can be a local storage location (e.g., in a local register file) associated with the source processing engine. The write-source location is associated with a source one of the processing engines. A write-target location in the shared memory to which the write data is to be written is also identified. The write-target location is writeable via a direct path by a surrogate one of the plurality of processing engines. The write data is transferred from the write-source location to the surrogate processing engine via an interconnect circuit that is adapted to selectably deliver data from any location in the shared memory or any local storage location to any one of the processing engines. The surrogate processing engine is operated to write the write data via the direct path to the write-target location in the shared memory. In some implementations the write data path via the surrogate processing engine may be reduced to a low-latency bypass path; in other embodiments, the path traverses a processing pipeline of the surrogate processing engine.

In some embodiments, transferring the write data includes delivering the write data from the write-source location to a selection circuit that selects between data from the local register file associated with the source processing engine and data from a location in the shared memory. The selection circuit operates to deliver the write data to the interconnect circuit; and the interconnect circuit operates to deliver the write data to the surrogate processing engine.

In some embodiments, the same circuits are used to perform a read operation. For example, a read operation can include identifying a read-source location in the shared memory, the read-source location storing read data. A read-target location to which the read data is to be delivered is identified. The read-target location being associated with a destination one of the plurality of processing engines and might be, e.g., in a local register file associated with the destination processing engine. The read data is transferred from the read-source location to the destination one of the plurality of processing engines via the interconnect circuit, and the destination one of the plurality of processing engines operates to load the read data into the read-target location.

According to a further aspect of the present invention, a method of writing data to a shared memory in a processor having multiple processing engines operable in parallel includes identifying, in parallel, a first source location for first data to be written and a second source location for second data to be written. The first source location and the second source location are associated, respectively, with a first source one of the processing engines and a second source one of the processing engines. A first target location for the first data and a second target location for the second data are identified in parallel. Each of the first and second target locations is in the shared memory; the first target location is writeable via a direct path by a first surrogate one of the plurality of processing engines and the second target location is writeable via a direct path by a second surrogate one of the plurality of processing engines. The first data and the second data are transferred in parallel from the first and second source locations to the first and second surrogate processing engines, respectively, via an interconnect circuit that is adapted to deliver data from any location in the shared memory to any one of the processing engines. The first and second surrogate processing engines operate in parallel to write the first data and the second data to the first target location and the second target location, respectively. The same processing engine can be used, e.g., as the first source processing engine and the second surrogate processing engine during this operation.

In some embodiments, the first source location is a location in a first local register file lane assigned to the first source processing engine, and the second source location is a location in a second local register file lane assigned to the second source processing engine. Transferring the first data and the second data may include delivering the first data from the first source location to a first selection circuit that selects between data from the first local register file lane and data from one of a first subset of locations in the shared memory and, in parallel with delivering the first data, delivering the second data from the second source location to a second selection circuit that selects between data from the second local register file lane and data from one of a second subset of locations in the shared memory. The first selection circuit and the second selection circuit operate in parallel to deliver the first data and the second data to the interconnect circuit. The interconnect circuit operates to deliver the first data to the first surrogate processing engine and the second data to the second surrogate processing engine.

The following detailed description together with the accompanying drawings will provide a better understanding of the nature and advantages of the present invention.

DETAILED DESCRIPTION OF THE INVENTION

Embodiments of the present invention relate to a shared memory usable by concurrent threads in a multithreaded processor, in which any addressable storage location is readable and writeable by any of the threads. Processing engines that execute the threads are coupled to the shared memory via an interconnect that transfers data in only one direction (e.g., from the shared memory to the processing engines); the same interconnect supports both read and write operations. The interconnect advantageously supports multiple parallel read or write operations. The single-direction data interconnect can reduce chip area and power consumption as compared to providing separate read and write interconnects. In some embodiments, the shared memory is accessed as a shared cache memory (through associative tag lookup); in others, locations in the shared memory are accessed directly by address. Accordingly, the term "shared memory" as used herein is to be understood as including cache memory as well as directly accessed memory.

System Overview

Figure 1:
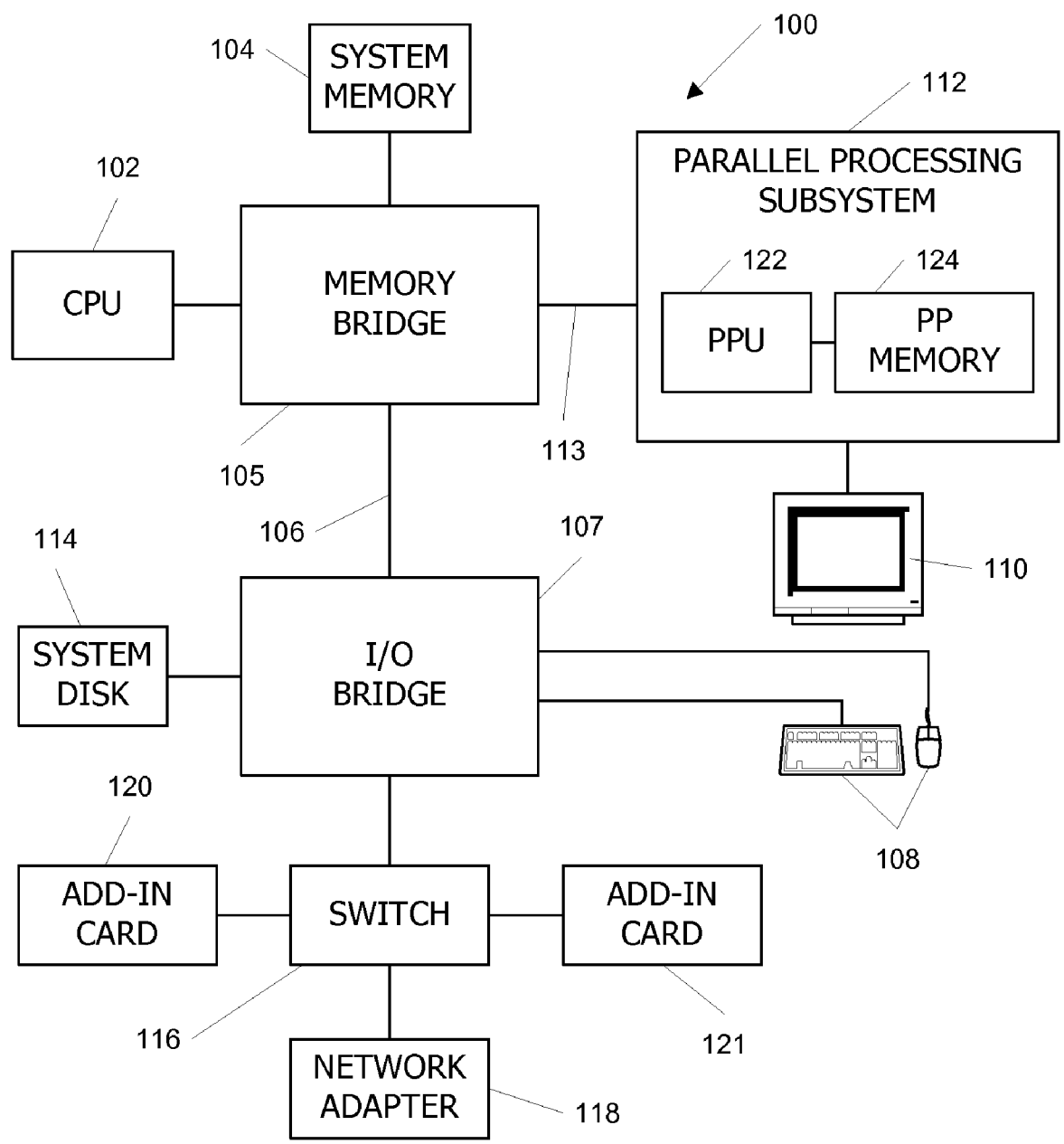
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express or Accelerated Graphics Port link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

Parallel processing subsystem 112 includes a parallel processing unit (PPU) 122 and a parallel processing (PP) memory 124, which may be implemented, e.g., using one or more integrated circuit devices such as programmable processors, application specific integrated circuits (ASICs), and memory devices. PPU 122 advantageously implements a highly parallel processor including one or more processing cores, each of which is capable of executing a large number (e.g., hundreds) of threads concurrently. PPU 122 can be programmed to perform a wide array of computations, including data transforms such as FFTs. PPU 122 may transfer data from system memory 104 and/or PP memory 124 into internal memory, process the data, and write result data back to system memory 104 and/or PP memory 124, where such data can be accessed by other system components, including, e.g., CPU 102. In some embodiments, PPU 122 is a graphics processor that can also be configured to perform various tasks related to generating pixel data from graphics data supplied by CPU 102 and/or system memory 104 via memory bridge 105 and bus 113, interacting with PP memory 124 (which can be used as graphics memory including, e.g., a conventional frame buffer) to store and update pixel data, delivering pixel data to display device 110, and the like. In some embodiments, PP subsystem 112 may include one PPU 122 operating as a graphics processor and another PPU 122 used for general-purpose computations, and the PPUs may be identical or different, and each PPU may have its own dedicated PP memory device(s) or no dedicated PP memory device(s).

CPU 102 operates as the master processor of system 100, controlling and coordinating operations of other system components. In particular, CPU 102 issues commands that control the operation of PPU 122. In some embodiments, CPU 102 writes a stream of commands for PPU 122 to a command buffer, which may be in system memory 104, PP memory 124, or another storage location accessible to both CPU 102 and PPU 122. PPU 122 reads the command stream from the command buffer and executes commands asynchronously with operation of CPU 102.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of PPU 122 to the rest of system 100 may also be varied. In some embodiments, PP system 112 is implemented as an add-in card that can be inserted into an expansion slot of system 100. In other embodiments, a PPU can be integrated on a single chip with a bus bridge, such as memory bridge 105 or I/O bridge 107. In still other embodiments, some or all elements of PPU 122 may be integrated with CPU 102.

A PPU may be provided with any amount of local PP memory, including no local memory, and may use local memory and system memory in any combination. For instance, PPU 122 can be a graphics processor in a unified memory architecture (UMA) embodiment; in such embodiments, little or no dedicated graphics (PP) memory is provided, and PPU 122 would use system memory exclusively or almost exclusively. In UMA embodiments, the PPU may be integrated into a bridge chip or provided as a discrete chip with a high-speed link (e.g., PCI-E) connecting the PPU to the bridge chip and system memory.

It is also to be understood that any number of PPUs may be included in a system, e.g., by including multiple PPUs on a single add-in card or by connecting multiple graphics cards to path 113. Multiple PPUs may be operated in parallel to process data at higher throughput than is possible with a single PPU.

Systems incorporating PPUs may be implemented in a variety of configurations and form factors, including desktop, laptop, or handheld personal computers, servers, workstations, game consoles, embedded systems, and so on.

Core Overview

Figure 2:
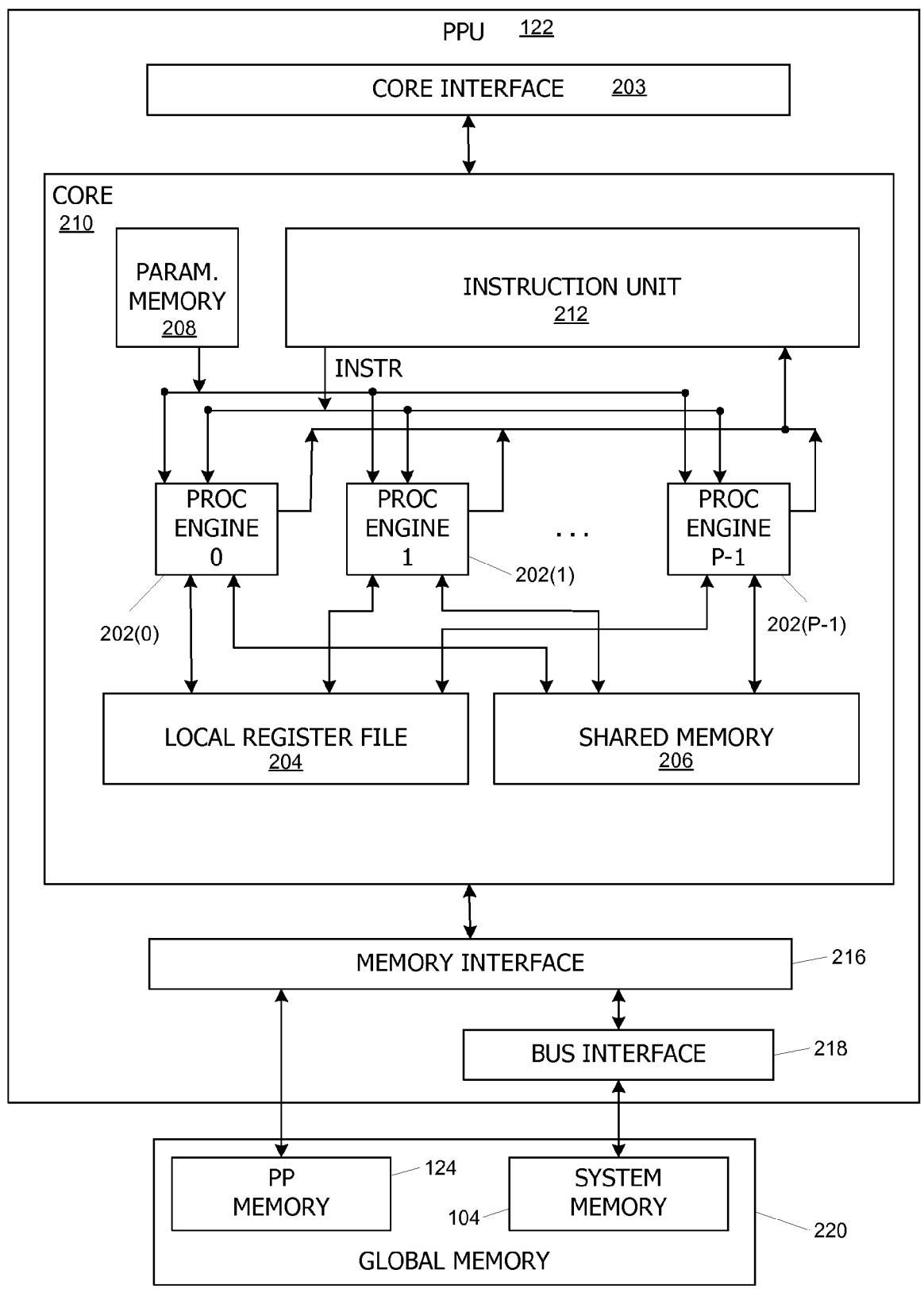
FIG. 2 is a block diagram of a graphics processing unit usable in an embodiment of the present invention.

FIG. 2 is a block diagram of a PPU 122 usable in an embodiment of the present invention. PPU 122 includes a core 210 configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units.

In one embodiment, core 210 includes an array of P (e.g., 8, 16, etc.) parallel processing engines 202 configured to receive SIMD instructions from a single instruction unit 212. Each processing engine 202 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each processing engine 202 uses space in a local register file (LRF) 204 for storing its local input data, intermediate results, and the like. In one embodiment, local register file 204 is physically or logically divided into P lanes, each having some number of entries (where each entry might store, e.g., a 32-bit word). One lane is assigned to each processing engine 202, and corresponding entries in different lanes can be populated with data for different threads executing the same program to facilitate SIMD execution. In some embodiments, each processing engine 202 can only access LRF entries in the lane assigned to it. The total number of entries in local register file 204 is advantageously large enough to support multiple concurrent threads per processing engine 202.

Each processing engine 202 also has access to an on-chip shared memory 206 that is shared among all of the processing engines 202 in core 210. Shared memory 206 may be as large as desired, and in some embodiments, any processing engine 202 can read to or write from any location in shared memory 206 with equally low latency (e.g., comparable to accessing local register file 204). In some embodiments, shared memory 206 can be implemented using shared cache memory. An example implementation of shared memory 206 is described below.

In addition to shared memory 206, some embodiments also provide additional on-chip parameter memory and/or cache(s) 208, which may be implemented, e.g., as a conventional RAM or cache. Parameter memory/cache 208 can be used, e.g., to hold state parameters and/or other data (e.g., textures or primitives for a shader program) that may be needed by multiple threads. Processing engines 202 also have access via a memory interface 216 to additional off-chip global memory 220, which includes, e.g., PP memory 124 and/or system memory 104, with system memory 104 being accessible by memory interface 216 via a bus interface 218; it is to be understood that any memory external to PPU 122 may be used as global memory 220. Memory interface 216 and bus interface 218 may be of generally conventional design, and other appropriate interfaces may be substituted. Processing engines 202 are advantageously coupled to memory interface 216 via an interconnect (not explicitly shown) that allows any processing engine 202 to access global memory 220.

In one embodiment, each processing engine 202 is multi-threaded and can execute up to some number G (e.g., 24) of threads concurrently, e.g., by maintaining current state information associated with each thread in a different portion of its assigned lane in local register file 204. Processing engines 202 are advantageously designed to switch rapidly from one thread to another so that instructions from different threads can be issued in any sequence without loss of efficiency.

Instruction unit 212 is configured such that, for any given processing cycle, the same instruction (INSTR) is issued to all P processing engines 202. Thus, at the level of a single clock cycle, core 210 implements a P-way SIMD microarchitecture. Since each processing engine 202 is also multi-threaded, supporting up to G threads, core 210 in this embodiment can have up to P*G threads executing concurrently. For instance, if P=16 and G=24, then core 210 supports up to 384 concurrent threads.

Because instruction unit 212 issues the same instruction to all P processing engines 202 in parallel, core 210 is advantageously used to process threads in "SIMD groups." As used herein, a "SIMD group" refers to a group of up to P threads of execution of the same program on different input data, with one thread of the group being assigned to each processing engine 202. (A SIMD group may include fewer than P threads, in which case some of processing engines 202 will be idle during cycles when that SIMD group is being processed.) Since each processing engine 202 can support up to G threads, it follows that up to G SIMD groups can be executing in core 210 at any given time.

On each clock cycle, one instruction is issued to all P threads making up a selected one of the G SIMD groups. To indicate which thread is currently active, a "group index" (GID) for the associated thread may be included with the instruction. Processing engine 202 uses group index GID as a context identifier, e.g., to determine which portion of its assigned lane in local register file 204 should be used when executing the instruction. Thus, in a given cycle, all processing engines 202 in core 210 are nominally executing the same instruction for different threads in the same group. (In some instances, some threads in a group may be temporarily idle, e.g., due to conditional or predicated instructions, divergence at branches in the program, or the like.)

Operation of core 210 is advantageously controlled via a core interface 203. In some embodiments, core interface 203 receives data to be processed (e.g., vertex data and/or pixel data) as well as state parameters and commands defining how the data is to be processed (e.g., what program is to be executed). Core interface 203 can load data to be processed into shared memory 206 and parameters into parameter memory 208. Core interface 203 also initializes each new thread or SIMD group in instruction unit 212, then signals instruction unit 212 to begin executing the threads. When execution of a thread or SIMD group is completed, core 210 advantageously notifies core interface 203. Core interface 203 can then initiate other processes, e.g., to retrieve output data from shared memory 206 and/or to prepare core 210 for execution of additional threads.

It will be appreciated that the core architecture described herein is illustrative and that variations and modifications are possible. Any number of processing engines may be included. In some embodiments, each processing engine has its own local register file, and the allocation of local register file entries per thread can be fixed or configurable as desired. Further, while only one core 210 is shown, a PPU 122 may include any number of cores 210, with appropriate work distribution logic to distribute incoming processing tasks among the available cores 210, further increasing the processing capacity. Each core 210 advantageously operates independently of other cores 210 and has its own processing engines, shared memory, and so on. Where multiple cores 210 are present, PPU 122 may include a work distribution unit (not explicitly shown) that distributes processing tasks among the available cores.

In accordance with some embodiments of the present invention, multithreaded processing core 210 of FIG. 2 can execute graphics shader programs such as pixel shaders, vertex shaders, and geometry shaders. As is known in the art, graphics processing generally includes a vertex stage, a rasterization stage, and a pixel (or fragment) stage. At the vertex stage, individual vertices of primitives that define various objects in a scene are manipulated (e.g., transformed) in accordance with the instructions of a vertex shader program. Additionally, if a geometry shader program is provided, primitives (groups of vertices) may also be manipulated. Rasterization determines which primitives are visible in which pixels of the rendered image. In the pixel stage, a color is determined for each pixel based on the primitive(s) that cover that pixel, in accordance with instructions of a pixel shader program. Core 210 is advantageously configurable for concurrent execution of vertex shader threads, pixel shader threads, and/or geometry shader threads. For example, where core 210 executes multiple SIMD groups, one SIMD group might consist of up to P vertex threads while a different SIMD group consists of up to P pixel threads.

Traditionally, a vertex shader program manipulates each vertex independently, and a pixel shader program manipulates each pixel independently. Thus, when core 210 executes graphics threads, sharing of information (other than state parameters for the various shaders) between threads might not be required.

During graphics processing, however, processing engines in core 210 advantageously have access to shared memory 206, and shared memory 206 may be used to store data for each thread, regardless of whether the data is shared among threads. For instance, in the case of vertex threads, shared memory 206 can be used to store the input vertex data and/or the output vertex data for each thread.

To the extent that sharing of data among graphics threads is desirable, core 210 can exploit shared memory 206 to support data sharing. For instance, it has been proposed to introduce geometry shader programs that manipulate primitives (or groups of primitives) rather than individual vertices. It is possible that one vertex could be a part of multiple primitives. Accordingly, in some embodiments, shared memory 206 can be used to store input data for a geometry shader program, making data for a particular vertex available to any thread that needs it.

As another example, in some pixel shader algorithms, it is useful to approximate the derivative of some attribute of the primitive at the pixel location. This can be done by comparing values of the attribute in adjacent pixels. In some embodiments, the attribute values for neighboring (e.g., adjacent) pixels are all stored in predictable places in shared memory 206, and shared memory 206 can be used to support sharing of pixel data (referred to herein as "swizzling") among threads processing neighboring pixels. Another embodiment of the present invention that supports pixel swizzling where pixel attribute values are stored in LRF 204 is described below.

In addition to graphics operations, some embodiments of multithreaded processing core 210 of FIG. 2 can also execute general-purpose computations using cooperative thread arrays (CTAs). As used herein, a "CTA" is a group of multiple threads that concurrently execute the same program on an input data set to produce an output data set. Each thread in the CTA is assigned a unique thread identifier ("thread ID") that is accessible to the thread during its execution. The thread ID controls various aspects of the thread's processing behavior. For instance, a thread ID may be used to determine which portion of the input data set a thread is to process, to identify one or more other threads with which a given thread is to share an intermediate result, and/or to determine which portion of an output data set a thread is to produce or write.

CTAs are advantageously employed to perform computations that lend themselves to a data parallel decomposition, i.e., application of the same processing algorithm to different portions of an input data set in order to effect a transformation of the input data set to an output data set. Examples include matrix algebra, linear and/or nonlinear transforms in any number of dimensions (e.g., fast Fourier transforms), and various filtering algorithms including convolution filters in any number of dimensions, separable filters in multiple dimensions, and so on. The processing algorithm to be applied to each portion of the input data set is specified in a "CTA program," and each thread in a CTA executes the same CTA program on one portion of the input data set. A CTA program can implement algorithms using a wide range of mathematical and logical operations, and the program can include conditional or branching execution paths and direct and/or indirect memory access.

Threads in a CTA can share input data, processing parameters, and/or intermediate results with other threads in the same CTA using shared memory 206. In some embodiments, a CTA program includes an instruction to compute an address in shared memory 206 to which particular data is to be written, with the address being a function of thread ID. Each thread computes the function using its own thread ID and writes to the corresponding location. The address function is advantageously defined such that different threads write to different locations; as long as the function is deterministic, the location written to by any thread is predictable. The CTA program can also include an instruction to compute an address in shared memory 206 from which data is to be read, with the address being a function of thread ID. By defining suitable functions and providing synchronization techniques, data can be written to a given location in shared memory 206 by one thread and read from that location by a different thread in a predictable manner. Consequently, any desired pattern of data sharing among threads can be supported, and any thread in a CTA can share data with any other thread in the same CTA.

For example, as is known in the art, an array of data values (e.g., pixels) can be filtered using a 2-D kernel-based filter algorithm, in which the filtered value of each pixel is determined based on the pixel and its neighbors. In some instances the filter is separable and can be implemented by computing a first pass along the rows of the array to produce an intermediate array, then computing a second pass along the columns of the intermediate array. In one CTA implementation of a separable 2-D filter, the threads of the CTA load the input data set (or a portion thereof) into shared memory 206, then synchronize. Each thread performs the row-filter for one point of the data set and writes the intermediate result to shared memory 206. After all threads have written their row-filter results to shared memory 206 and have synchronized at that point, each thread performs the column-filter for one point of the data set. In the course of performing the column filter, each thread reads the appropriate row-filter results from shared memory 206, and a thread may read row-filter results that were written by any thread of the CTA. The threads write their column-filter results to shared memory 206. The resulting data array can be stored to global memory or retained in shared memory 206 for further processing. Where shared memory 206 can be accessed with lower latency and/or greater bandwidth than global memory, storing intermediate results in shared memory 206 advantageously improves processor throughput.

Since all threads in a CTA execute the same program, any thread can be assigned any thread ID, as long as each valid thread ID is assigned to only one thread. In one embodiment, thread IDs are assigned sequentially to threads as they are launched, as described in above-referenced application Ser. No. 11/305,178. It should be noted that as long as data sharing is controlled by reference to thread IDs, the particular assignment of threads to processing engines will not affect the result of the CTA execution. Thus, a CTA program can be independent of the particular hardware on which it is to be executed.

Any unique identifier (including but not limited to numeric identifiers) can be used as a thread ID. In one embodiment, if a CTA includes some number (T) of threads, thread IDs are simply sequential (one-dimensional) index values from 0 to T−1. In other embodiments, multidimensional indexing schemes can be used.

In addition to thread IDs, some embodiments also provide a CTA identifier that is common to all threads in the CTA. CTA identifiers can be helpful, e.g., where an input data set is to be processed using multiple CTAs that process different (possibly overlapping) portions of an input data set. The CTA identifier may be stored in a local register of each thread, in a state register accessible to all threads of the CTA, or in other storage accessible to the threads of the CTA. While all threads within a CTA are executed concurrently, there is no requirement that different CTAs are executed concurrently, and the hardware need not support sharing of data between threads in different CTAs.

It will be appreciated that the size (number of threads) of a CTA and number of CTAs required for a particular application will depend on the application. Thus, the size of a CTA, as well as the number of CTAs to be executed, are advantageously defined by a programmer or driver program and provided to core 210 and core interface 203 as state parameters.

CTAs are described in further detail in above-referenced application Ser. No. 11/305,178. Those skilled in the art will appreciate that use of shared memory according to an embodiment of the present invention is not limited to CTAs or graphics; shared memory as described herein can be used in any circumstance where two or more concurrent threads in a processing core benefit from sharing input data, output data, and/or intermediate result data.

Shared Memory Example

In some embodiments, shared memory 206 is advantageously implemented within core 210, in close proximity to processing engines 202, allowing processing engine 202 to access shared memory 206 with low latency. Shared memory 206 may be implemented using known data storage circuits such as dynamic or static random-access memories (DRAM or SRAM), register arrays, cache circuits, or the like. Low access latency allows shared memory 206 to be used as a working memory that can be accessed frequently while maintaining high throughput in processor core 210. In some embodiments, shared memory 206 can be accessed with a latency comparable to local register file 204.

In addition, placing shared memory 206 in close proximity to processing engines 202 can help reduce power dissipation in core 210. In some low-power implementations, shared memory 206 is implemented using circuits that support location-based addressing (e.g., SRAM circuits) rather than associative tag lookup (e.g., cache circuits).

As noted above, core 210 advantageously executes SIMD groups of threads, and threads in a SIMD group execute the same instruction in parallel. Thus, a group of threads may simultaneously request access to one or more target locations in shared memory 206. In some instances (e.g., for CTA threads), each thread independently computes a target address in shared memory 206, and there is no guaranteed relationship among the target addresses computed by different threads in a SIMD group. For instance, all threads in a SIMD group might compute the same target address (e.g., to obtain a processing parameter such as a filter coefficient), or the threads might compute different target addresses separated by a consistent "stride" (e.g., 1, 2, or 4 words) or different addresses separated by varying strides. In other instances, some but not all threads may compute the same target address, while other threads compute different target addresses. In short, parallel requests from a SIMD group may target any combination of the locations in shared memory 206. For optimum execution, shared memory 206 is advantageously designed to support parallel access by multiple processing engines to multiple independently computed target addresses.

In some embodiments, shared memory 206 is both readable and writeable by the threads executing in processing engines 202, and any thread can read from and write to any location in shared memory 206. In one embodiment, read access to shared memory 206 is available through a "load. shared" instruction:

load.shared RD, [$A_{eff}$], which transfers data from the effective address $A_{eff}$ in shared memory 206 to a destination register RD in the lane of local register file 204 assigned to the processing engine 202 that executes the load.shared instruction. Similarly, write access to shared memory 206 is available through a "store.shared" instruction:

store.shared [$A_{eff}$], $R_S$, which transfers data from a source register $R_S$ in the lane of local register file 204 assigned to the processing engine 202 that executes the store.shared instruction to an effective address $A_{eff}$ in shared memory 206. In one embodiment, the effective address $A_{eff}$ for load.shared and store.shared operations is stored in one of the registers in the assigned lane of local register file 204; in another embodiment, the effective address is determined by adding an offset to a virtual address stored in one of the registers in the assigned lane of local register file 204, as described below. In some embodiments, the effective address $A_{eff}$ can also be provided as an immediate operand.

Figure 3:
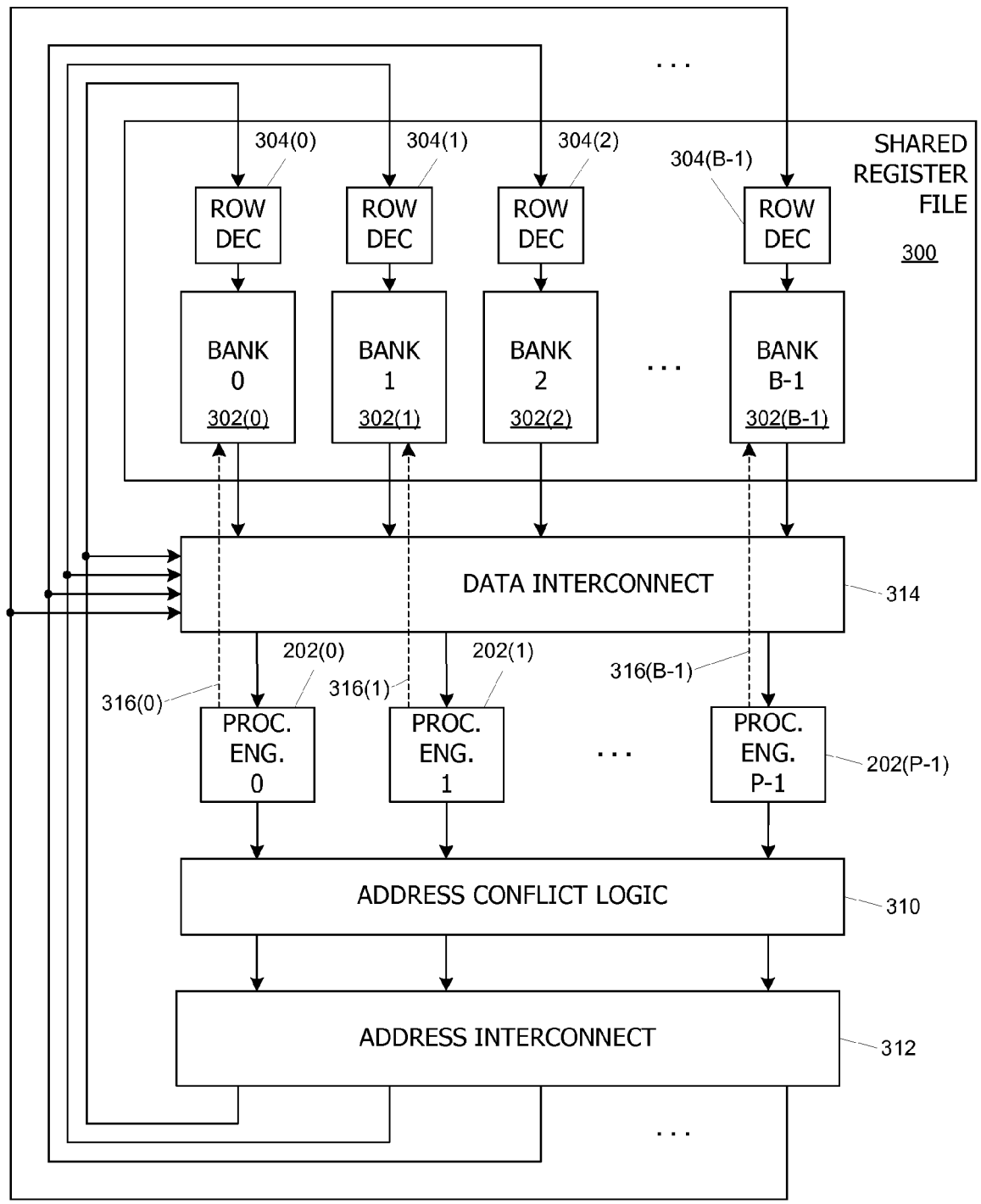
FIG. 3 is a block diagram of a shared register file implementing a shared memory according to an embodiment of the present invention.

FIG. 3 is a block diagram of a shared register file (SRF) 300 implementing shared memory 206 of FIG. 2 according to an embodiment of the present invention. In this embodiment, SRF 300 includes a number (B) of banks 302, each of which can be implemented as a single-ported SRAM that includes some number of rows (not explicitly shown). Each row (also referred to herein as an "entry") in a bank 302 may store, e.g., a 32-bit word or other convenient unit of data. Each bank 302 has an independent row decoder 304, allowing each bank 302 to be independently addressed. Up to one entry in each bank 302 can be accessed in parallel without requiring any correlation between the accessed entries in different banks 302; in other words, any entry in one bank (e.g., bank 302(0)) can be accessed in parallel with any entry in another bank (e.g., bank 302(2)). SRF 300 may include any number B of banks 302 (e.g., 2, 4, 8, 16, etc.). In some embodiments, the number B of banks 302 is at least as large as the number P of processing engines 202; where this is the case, at least some combinations of parallel access requests to SRF 300 can be satisfied in parallel, as described below. Each bank 302 may include any number of rows, e.g., 256, 512 or 1K, and the same number of rows is advantageously included in each bank 302.

Figure 4:
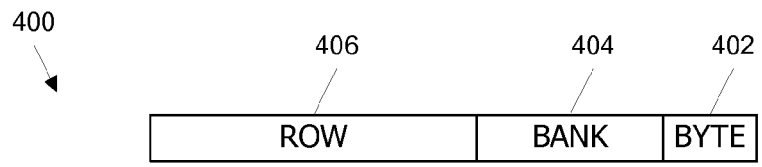
FIG. 4 illustrates one address format that can be used for byte-addressable data in a shared memory according to an embodiment of the present invention.

Each entry in SRF 300 advantageously has a unique address. FIG. 4 illustrates one address format that can be used for byte-addressable data. An address 400 has a number of bits large enough to represent each byte in SRF 300; e.g., if the total capacity of SRF 300 is 16 KB, address 400 is advantageously 14 bits. For 32-bit words, the lowest two bits of address 400 are a byte field 402 that can be used to identify a specific byte within a word. The remaining bits identify the word (or entry if each entry is one word). More specifically, a bank field 404 includes $\log_2 B$ bits; for instance, if B is 16, then bank field 404 would include 4 bits. A row field 406 includes enough bits to allow each row in one bank 302 to have a unique identifier; for instance, if each bank 302 has 256 rows, row field 406 would include 8 bits. Address 400 interleaves banks 302 at word granularity; in other words, consecutive word-level addresses (i.e., addresses ending in "00") are in different banks 302.

It should also be noted that where SRF 300 is byte-addressable, load.shared and store.shared instructions can transfer less than a word of data. In one embodiment, data can be transferred in units of 1, 2, or 4 bytes. During a load operation to a 32-bit local register in local register file 204, any data unit smaller than a word can be zero-extended or sign-extended to the full width of the local register. During a store operation, any data unit smaller than a word is advantageously written to the appropriate subset of the word in SRF 300, leaving the rest of the bits unmodified.

Referring again to FIG. 3, there is also shown a communication path between SRF 300 and processing engines 202 for an embodiment where processing engines 202 are operated in SIMD fashion as described above. To execute an SRF read operation (e.g., a load.shared instruction), each processing engine 202 delivers a target address for one thread of a SIMD group to address conflict logic 310. Address conflict logic 310 enforces the condition that only one entry per bank 302 can be accessed in parallel. More specifically, address conflict logic 310 compares the target addresses provided by different processing engines 202 and detects cases where two or more target addresses are in the same bank (referred to herein as a "conflict"). Where a conflict exists, address conflict logic 310 selects one of the conflicting target addresses to be processed in the current operation and signals instruction unit 212 (FIG. 2) to retry the conflicting target addresses that were not selected. Operation of address conflict logic 310 is described further below.

The addresses selected by address conflict logic 310 are delivered to an address interconnect 312. Address interconnect 312 may be implemented, e.g., as a full crossbar allowing a target address originating from any one of processing engines 202 to be delivered to any one of row decoders 304.

Each row decoder 304, which may be of generally conventional design, accesses the entry in the corresponding bank 302 specified by the received target address. Bank 302 delivers read data from the target address to a data interconnect 314. Data interconnect 314, which may be implemented, e.g., as a full crossbar, can deliver a data word from any one of the banks 302 to any one (or more) of processing engines 202. In this manner, any processing engine 202 can access any bank 302 in SRF 300.

In some embodiments, a second data interconnect (not explicitly shown) can be provided to deliver data from the processing engines 202 to banks 302 during a write operation (e.g., a store.shared operation). The second data interconnect can also be implemented as a full crossbar such that data originating from any processing engine 202 can be delivered to any bank 302 in SRF 300.

In other embodiments, a second data interconnect is not provided. Instead, a direct write path 316 (shown as a dashed line) is provided from one of the processing engines 202 to each of the SRF banks 302. In embodiments where the number B of banks 302 is equal to the number P of processing engines 202, each processing engine 202 has a direct write path 316 to a different SRF bank 302. For a write operation, read data interconnect 314 is leveraged to obtain write source data, and direct write paths 316 from processing engines 202 to SRF banks 302 are used to deliver the write source data to the desired location in SRF 300. One such embodiment is described below.

It should be noted that direct write paths 316 can be implemented regardless of whether P=B. For instance, in some embodiments where P>B, B of the processing engines 302 each have a direct write path, and up to B data values can be written in parallel. In embodiments where P<B, some processing engines 302 may have more than one direct write path to different SRF banks 302; since only one of the direct write paths from a single processing engine 302 can be used at once, at most P data values can be written in parallel. Thus, in general, direct write paths 316 provide a write bandwidth corresponding to min(B, P).

Virtual Addressing

In some embodiments, processing engines 202 support virtual addressing into SRF 300. Virtual addressing allows blocks of memory within SRF 300 to be allocated to a particular group of concurrent threads. For instance, in the case of CTAs, a block might be allocated to a specific CTA, meaning that the block is accessible to all threads of that CTA and not accessible to any other threads, including threads of any other CTAs that may be concurrently executing in core 210. In the case of shader threads, a SIMD group might be allocated a block of SRF space. Allocation of space within SRF 300 can be managed, e.g., by core interface 203 of FIG. 2; conventional techniques for resource allocation can be used.

Figure 5:
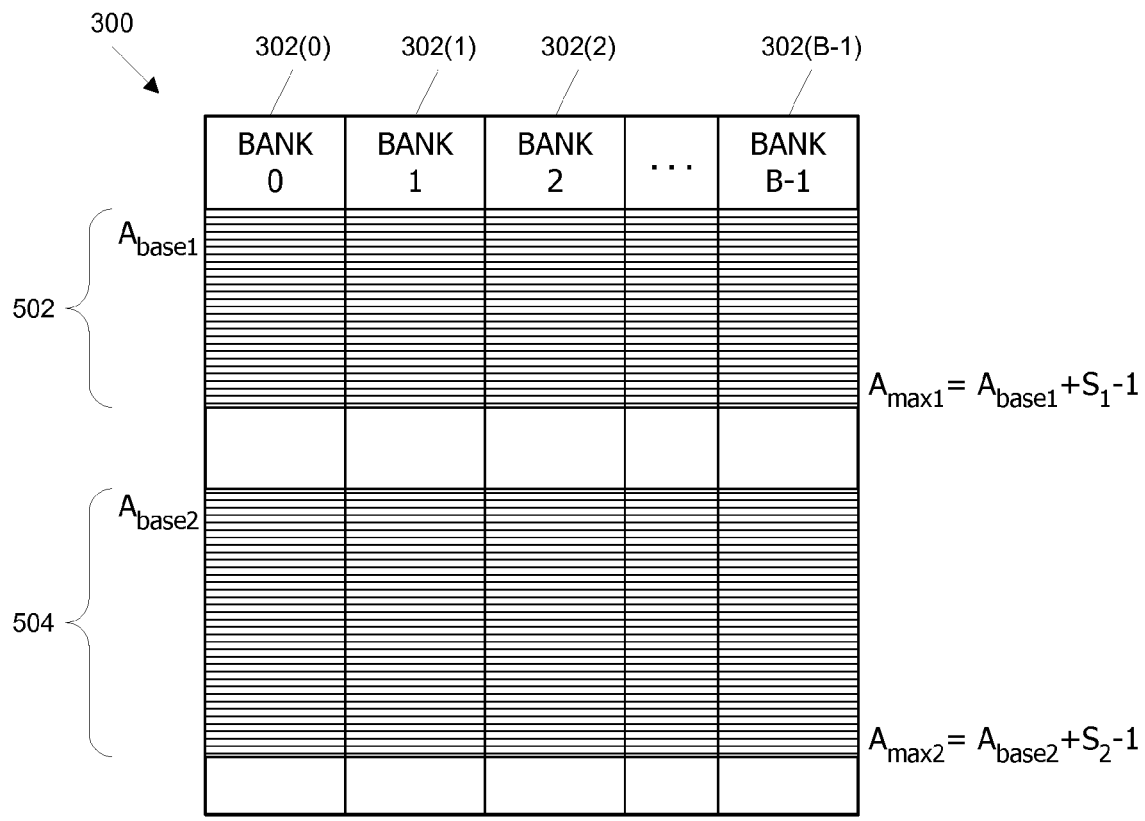
FIG. 5 illustrates virtual addressing in a shared register file implementing a shared memory according to an embodiment of the present invention.

FIG. 5 illustrates virtual addressing in SRF 300 according to an embodiment of the present invention. A block 502 of size $S_1$ words (or entries) is allocated to a first set of threads, which might be, e.g., the threads of a first CTA or a first SIMD group of shader threads for a rendering operation. The set of threads to which block 502 is allocated can include any number of threads, up to the maximum number (e.g., P*G) supported by core 210. The size $S_1$ is advantageously a multiple of the number B of banks in SRF 300. (If an allocation size that is not a multiple of B is requested, the size can be rounded up to the next multiple of B). Block 502 advantageously begins at a word address $A_{base1}$ that is assigned when the set of threads (e.g., CTA) is loaded and launched and ends at a word address $A_{max1}$ equal to $A_{base1}+S_1-1$. (It is to be understood that although word addresses are used in FIG. 5 for simplicity, byte addresses could also be used.) For the address format of FIG. 4, physical addresses are interleaved across all the banks, and block 502 consists of $S_1/B$ corresponding entries in each bank 302 of SRF 300.

Similarly, a block 504 of size $S_2$ words (or entries) can be allocated to a second set of threads, e.g., the threads of a second CTA or a second SIMD group of shader threads. Block 504 begins at a word address $A_{base2}$ that is assigned when the set of threads is loaded and launched and ends at a word address $A_{max2}$ equal to $A_{base2}+S_2-1$. It should be noted that size $S_2$ might or might not be equal to size $S_1$. For instance, in the case of a CTA, the threads of the second CTA might be executing the same CTA program as threads of the first CTA or a different program that requires a different amount of shared memory. In the case of shader threads, threads in different SIMD groups might be executing the same type of shader (e.g., vertex or pixel) or different types of shaders that might or might not require the same amount of shared memory.

A CTA program, shader program, or other program to be executed in core 210 can identify locations to be accessed in SRF 300 using "virtual" addresses $A_V$ in the appropriate interval, e.g., $[0, S_1)$ or $[0, S_2)$. As the threads are being loaded into core 210, a contiguous block of entries within SRF 300, e.g., starting at address $A_{base1}$ and ending at address $A_{max1}$, is allocated. In one embodiment, the first allocation starts at a base address $A_{base1}=0\times0$; the base address $A_{base2}$ for the next allocation can be address $S_1$ (or more generally $A_{base1}+S_1$); and so on. The base address for each set of threads is provided as a state parameter to the processing engines 202. During SRF access operations, processing engines 202 determine an effective address $A_{eff}$ by adding the appropriate base address (e.g., $A_{base1}$ or $A_{base2}$, depending on which thread is being executed) to the virtual address $A_V$ specified in the CTA program. This effective address is delivered to address conflict logic 310 of FIG. 3. In some embodiments, processing engines 202 may also perform range checking to ensure that $A_{eff}$ is in the allocated range, e.g., $[A_{base1}, A_{max1}]$ or $[A_{base2}, A_{max2}]$. Alternatively, processing engines 202 can perform range checking in parallel with computing $A_{eff}$, e.g., by verifying that $A_V$ is in the allocated range, e.g., $[0, S_1)$ or $[0, S_2)$.

It is to be understood that virtual addressing is optional. Where it is supported, virtual addressing can be used for any program that can execute in core 210, including but not limited to graphics shader programs and CTAs. Offset-based virtual addressing as described herein advantageously allows multiple independent sets of threads (e.g., two different CTAs or two different types of shader threads) to execute concurrently in core 210 in a manner that is transparent to the programmer. Offset-based virtual addressing also provides fast address translation at execution time. In addition, to the extent that a programmer optimizes the program code to avoid bank conflicts, the offset-based virtual addressing described herein preserves those optimizations.

Address Conflict Logic

As noted above, access requests to SRF 300 (e.g., load.shared or store.shared) are advantageously made in parallel for multiple threads (e.g., a SIMD group). A group of parallel requests can include up to P independently-determined addresses, one from each processing engine. There is no guaranteed relationship between addresses determined by different processing engines, and in particular, it is possible that two or more of the addresses might be in the same bank 302 in SRF 300. Where banks 302 are implemented using single-ported memory circuits, only one address in each bank can be accessed at a time. To handle conflicting addresses (two or more addresses in the same bank), core 210 advantageously includes address conflict logic 310 as shown in FIG. 3. Address conflict logic 310 advantageously detects conflicting addresses and allows at most one address per bank 302 to be delivered to SRF 300; any requests whose addresses are not delivered can be retried until all requests are eventually satisfied.

Figure 6:
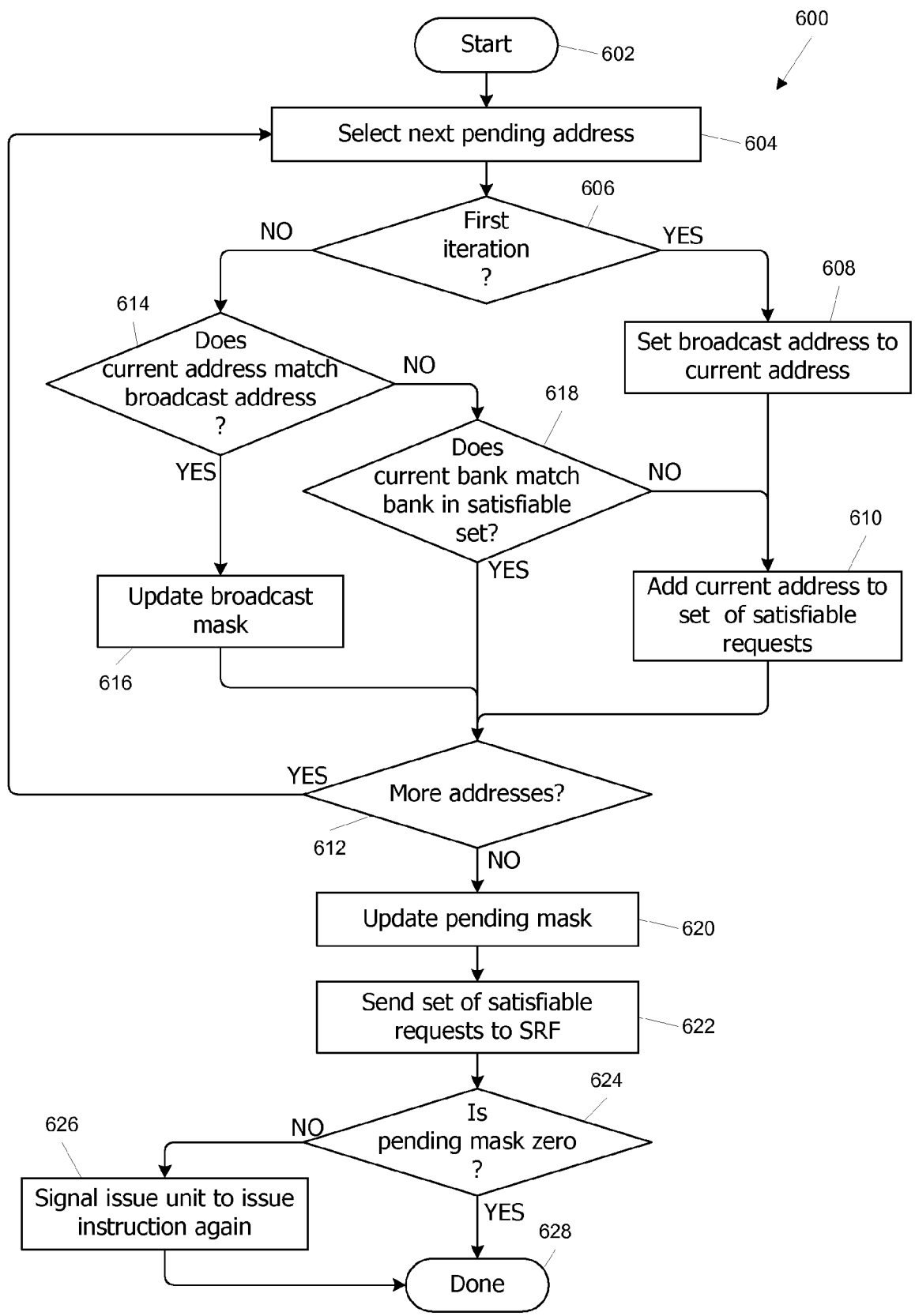
FIG. 6 is a flow diagram of a process for detecting and resolving conflicts among a number of target addresses included in a parallel group of shared memory access requests according to an embodiment of the present invention.

FIG. 6 is a flow diagram of a process 600 for detecting and resolving conflicts among up to P target addresses included in a SIMD group of requests according to an embodiment of the present invention. Process 600, which can be implemented in address conflict logic 310 of FIG. 3, is priority-based. Each processing engine 202 has a unique identifier i (ranging from 0 to P−1) associated therewith. In the event that two (or more) processing engines 202 request access to target addresses in the same bank 302, the processing engine with the lower identifier i is given priority over the processing engine with the higher identifier i; the latter request is "conflicted out" and deferred to a later processing cycle. In addition, to efficiently handle the case where multiple processing engines 202 request read access to the same target address, process 600 also selects one of the target addresses as a "broadcast" address; any requests for the broadcast address from any processing engine 202 are allowed to proceed in parallel. (As described below, data read from one bank 302 can be distributed to any number of processing engines 202.)

More specifically, process 600 starts (step 602) when a group of up to P target addresses is received by address conflict logic 310. The group of target addresses in one embodiment is accompanied by a P-bit "pending" mask that indicates which of the requests have not yet been satisfied; the corresponding target addresses are referred to herein as pending. Process 600 then loops over the pending addresses, beginning at step 604, where the first (highest priority) pending address is read. In this embodiment, pending addresses are considered in order of processing engine identifier i.

At step 606, on the first iteration of the loop, process 600 proceeds to set the broadcast address to the current (i.e., first) pending address at step 608. Process 600 may also define a broadcast mask indicating which of the up to P requests target the broadcast address. Where a broadcast mask is defined, step 608 advantageously includes initializing the mask. At step 610, the broadcast address becomes the first address in a current set of "satisfiable" requests—i.e., requests that will be forwarded to address interconnect 312. At step 612, if the group includes more pending addresses, process 600 returns to step 604 to process the next pending address.

For the second pending address (and any subsequent pending addresses), from step 606, process 600 proceeds to step 614 to determine whether the current pending address matches the broadcast address. If so, then the broadcast mask is updated at step 616 to include the processing engine 202 that provided the current pending address, and process 600 proceeds to step 612.

If, at step 614, the current pending address does not match the broadcast address, then at step 618, it is determined whether the bank for the current pending address matches the bank for any address already in the set of satisfiable requests. In one embodiment, this determination is made by comparing bank field 404 (see FIG. 4) of the current address to the bank field 404 of each address in the satisfiable set. If the bank field of the current address does not match the bank field for any address already in the set, then the current address is added to the satisfiable set at step 610. If the bank field of the current address does match the bank field of the address already in the satisfiable set, then there is a conflict, and the current address cannot be satisfied on this access cycle; process 600 continues with the next address at step 612.

The loop continues until all pending addresses have been processed. Thereafter, at step 620, the pending mask is updated to remove any processing engine 202 for which the target address is in the satisfiable set. The satisfiable set of target addresses is sent to SRF 300 (e.g., via address interconnect 312 of FIG. 3) at step 622.

At step 624, it is determined whether the pending mask is zero. If not, then at step 626, process 600 signals instruction unit 212 of FIG. 2 to issue the access instruction again with the updated pending mask. At step 628, process 600 ends. Using process 600, at least one pending request will be satisfied in each access cycle, and all requests will be satisfied in the same access cycle to the extent that the addresses of different requests are in different banks. Only requests for addresses that are in the same bank as a higher-priority request and that do not match the broadcast address will be deferred. Instruction issue unit 212 reissues the SRF access instruction for any requests that were deferred (in some embodiments, immediately after receiving the updated pending mask), and process 600 executes again with a smaller set of pending addresses. The SRF access instruction can be reissued as many times as necessary, e.g., up to P times, until all requests are satisfied.

It will be appreciated that the conflict management process described herein is illustrative and that variations and modifications are possible. Steps described as sequential may be executed in parallel, order of steps may be varied, and steps may be modified or combined. For instance, the various address comparisons can be performed in parallel rather than in a serial loop. Any processing engine may be designated as highest priority, as all SRF access requests in the group will be satisfied before the next instruction for the group is issued. Process 600 can be implemented using suitably-configured hardware, software, or any combination thereof.

Some hardware-based implementations of process 600 effectively unroll the loop using an array of parallel comparators to perform pairwise comparisons of the bank bits of all pending addresses and to compare each address to the broadcast address. Given a sufficient number of comparators, all of the address comparisons can be performed in a single clock cycle, supporting low-latency access to SRF 300. An example of one such hardware-based implementation will now be described.

Figure 7:
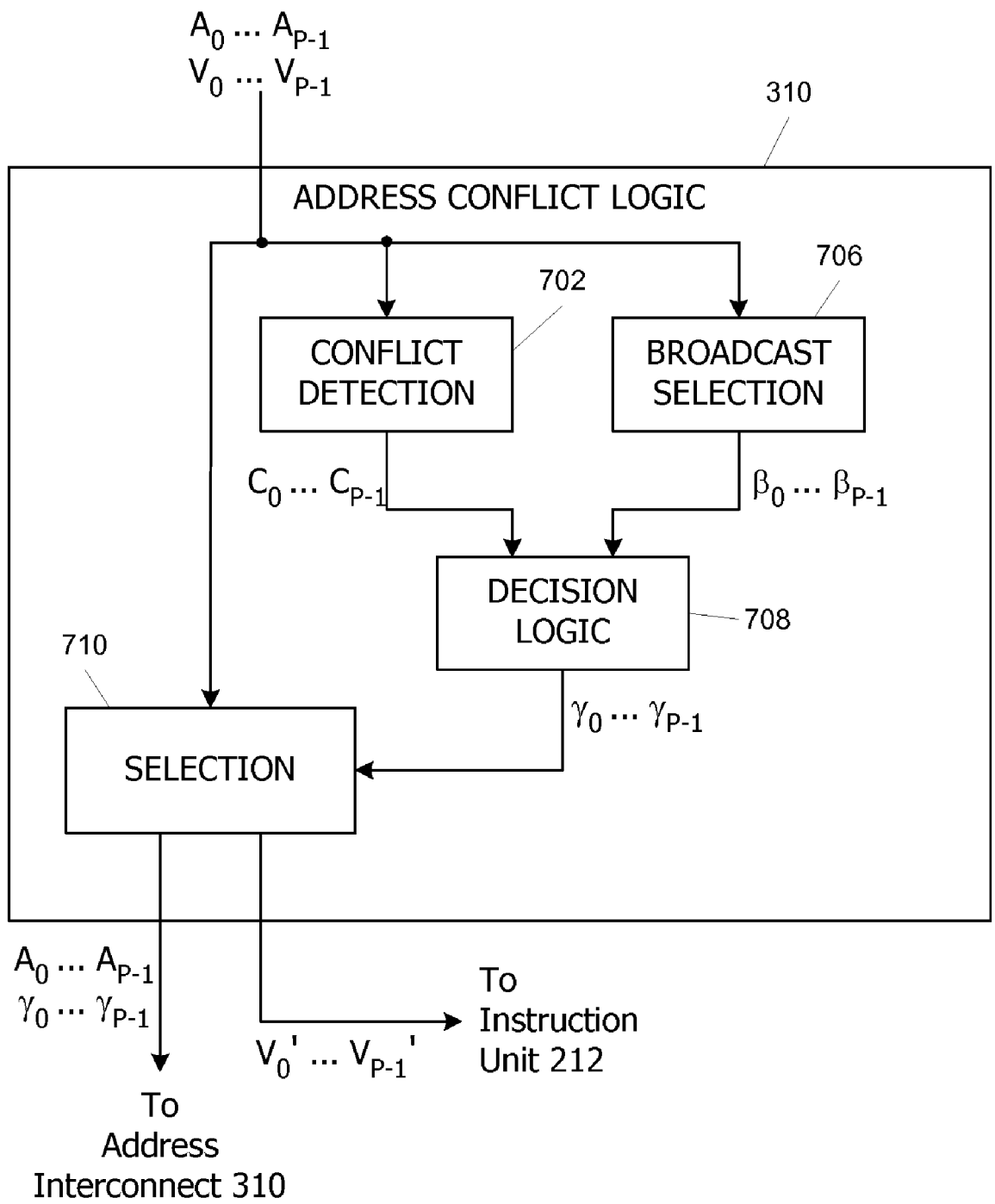
FIG. 7 is a block diagram of an address conflict logic subsystem according to an embodiment of the present invention.

FIG. 7 is a block diagram of address conflict logic 310 according to an embodiment of the present invention. In this embodiment, address conflict logic 310 includes a conflict detection unit 702, a broadcast selection unit 706, decision logic 708 and a final selection unit 710. Address conflict logic 310 receives a group of P addresses ($A_0 \ldots A_{P-1}$), one from each processing engine 202 and a P-bit pending (valid) mask ($V_0 \ldots V_{P-1}$) indicating which of the requests in the group are pending. In this embodiment, a bit $V_i$ is asserted (set to a logical true state) if the request from processing engine 202($i$) is pending and deasserted (set to a logical false state) otherwise.

In operation, conflict detection unit 702 compares the bank bits 404 (see FIG. 4) of the pending addresses ($A_0 \ldots A_{P-1}$) to detect bank conflicts and produces P one-bit conflict signals $C_0 \ldots C_{P-1}$. A conflict signal $C_i$ is asserted if the corresponding address $A_i$ conflicts with a pending address having higher priority (i.e., an address $A_j$ for which j<i and pending bit $V_j$ is logic high) and deasserted otherwise. In parallel, broadcast selection unit 706 selects the pending address $A_i$ with the lowest identifier i as a broadcast address and generates broadcast signals $\beta_0 \ldots \beta_{P-1}$. A broadcast signal $\beta_i$ is asserted if the address $A_i$ is pending and matches the broadcast address and deasserted otherwise.

Decision logic 708 receives the $C_i$ and $\beta_i$ signals and determines which requests are satisfiable. Decision logic 708 generates a set of go signals $\gamma_0 \ldots \gamma_{P-1}$. A go signal $\gamma_i$ is asserted if the address $A_i$ is pending ($V_i$ is asserted) and either there are no conflicts ($C_i$ is deasserted) or address $A_i$ is the broadcast address ($\beta_i$ is deasserted). Otherwise, $\gamma_i$ is deasserted.

Selection unit 710 updates the pending mask $V_0 \ldots V_{P-1}$ using the go signals $\gamma_i$ and sends the updated pending mask $V_0' \ldots V_{P-1}'$ to instruction unit 212 (FIG. 2). Selection unit 710 also sends the addresses $A_i$ whose go signals $\gamma_i$ are asserted to address interconnect 310.

Figure 8:
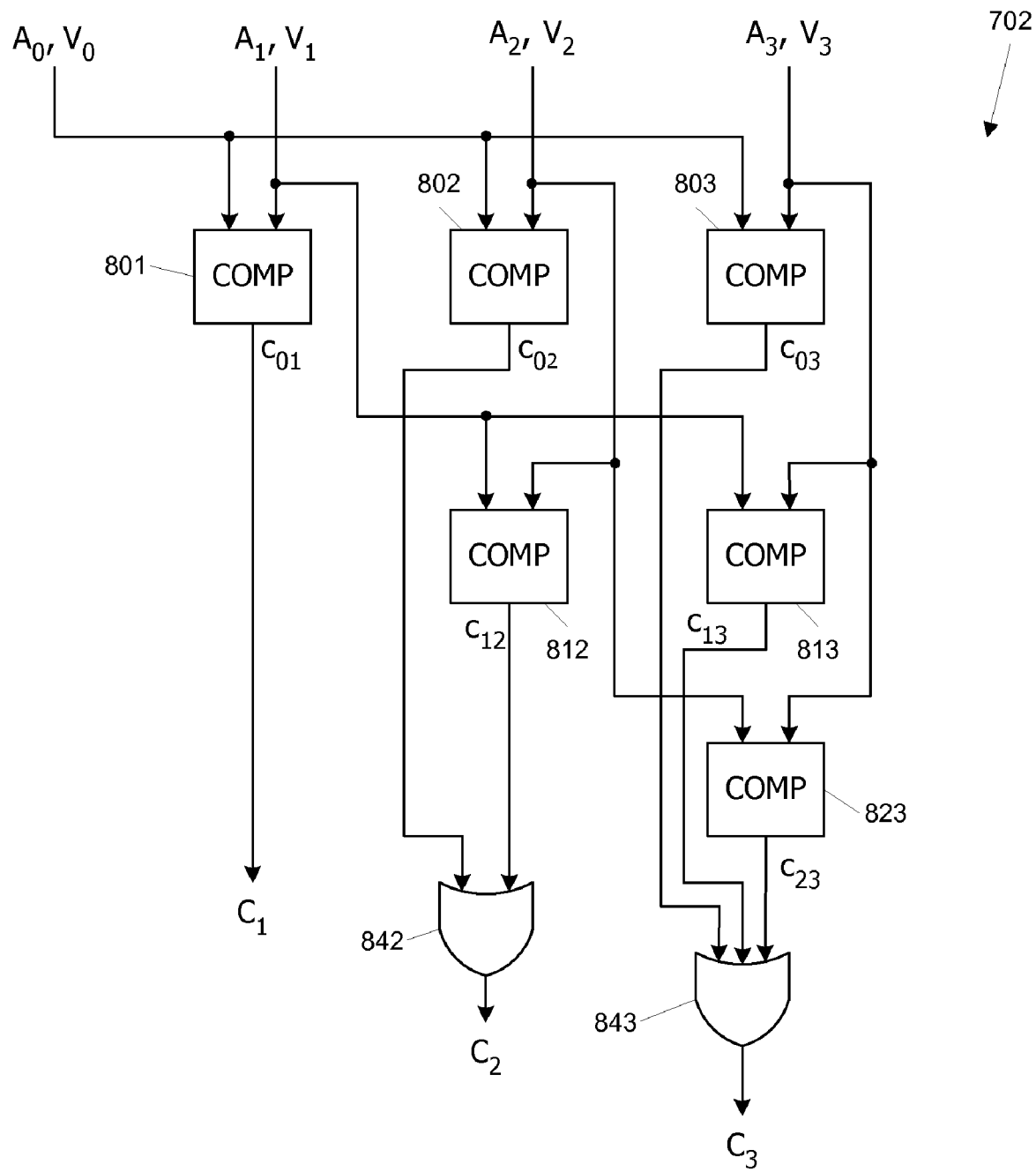
FIG. 8 is a block diagram of a conflict detection unit for the address conflict logic subsystem of FIG. 7 according to an embodiment of the present invention.

FIG. 8 is a block diagram of conflict detection unit 702 of FIG. 7 according to an embodiment of the present invention. In this embodiment, the number P of processing engines is 4; it is to be understood that conflict detection unit 702 could be modified for use with any number of processing engines. In this embodiment, address $A_0$ has highest priority; if pending-mask bit $V_0$ is asserted, the request for address $A_0$ will be allowed to proceed. Thus, a $C_0$ conflict signal need not be explicitly generated; in some embodiments, the $C_0$ signal can be always deasserted.

Conflict detection module 702 includes six comparison (COMP) circuits 801-803, 812, 813 and 823. Each comparison circuit 801-803, 812, 813 and 823 compares the bank bits (e.g., bank field 404 of address 400 of FIG. 4) of its two input addresses $A_i$, $A_j$ and produces an output bit $c_{ij}$ that is asserted if the bank bits of the two addresses match and deasserted otherwise. In some embodiments, each comparison circuit 801-803, 812, 813 and 823 also includes status checking logic that receives the pending-mask bits $V_i$, $V_j$ corresponding to its input addresses; unless both addresses are pending, the output bit $c_{ij}$ is advantageously deasserted. It should be noted that comparison circuits 801-803, 812, 813 and 823 can all operate in parallel to produce the complete set of $c_{ij}$ signals and that each comparison circuit need only compare $\log_2 B$ bits.

A conflict signal $C_i$ for each address $A_i$ is generated as a logical OR of the output bits $c_{ji}$ from comparisons of address $A_i$ to each address $A_j$ for which j<i. Thus, the conflict signal $C_1$ is just the output bit $c_{01}$ of comparison circuit 801. An OR gate 842 forms conflict signal $C_2$ as the logical OR of the respective output bits $c_{02}$ and $c_{12}$ of comparison circuits 802 and 812. An OR gate 843 forms conflict signal $C_3$ as the logical OR of the respective output bits $c_{03}$, $c_{13}$, and $c_{23}$ of comparators 803, 813 and 823. In other words, assuming addresses $A_0$-$A_3$ are all pending, conflict signal $C_1$ is asserted if address $A_1$ is in the same bank as address $A_0$; conflict signal $C_2$ is asserted if address $A_2$ is in the same bank as either address $A_1$ or address $A_0$; and conflict signal $C_3$ is asserted if address $A_3$ is in the same bank as any of addresses $A_2$, $A_1$ or $A_0$. The conflict signals $C_i$ are delivered to decision logic 708 as shown in FIG. 7.

Figure 9:
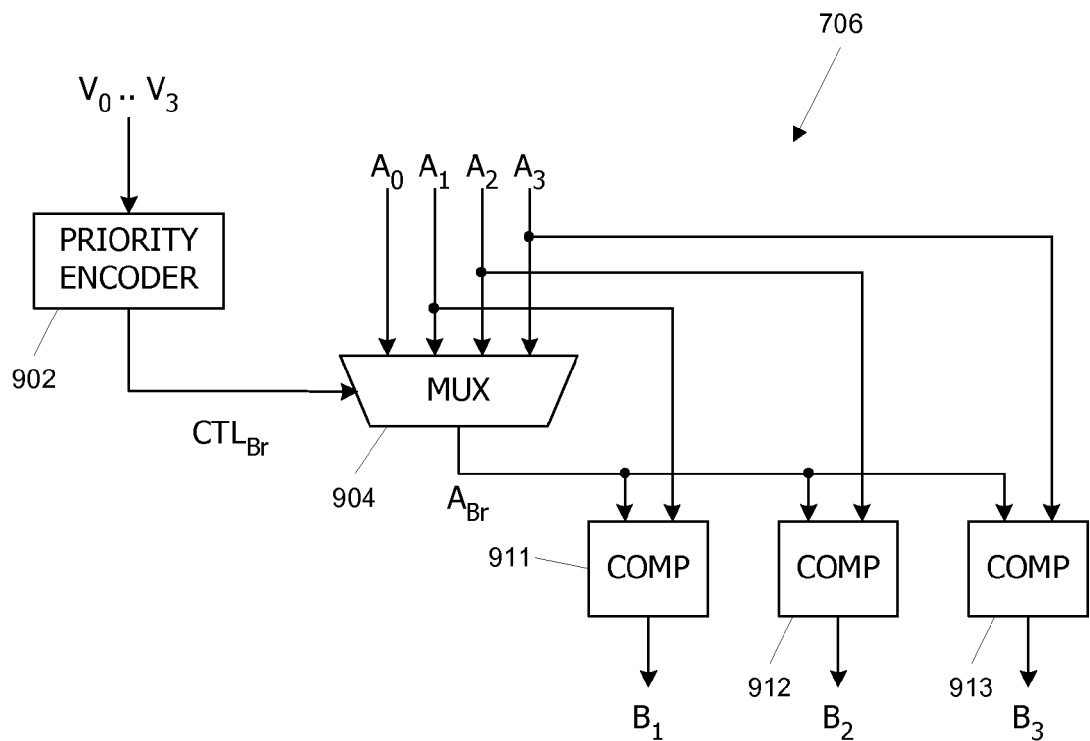
FIG. 9 is a block diagram of a broadcast selection unit for the address conflict logic subsystem of FIG. 7 according to an embodiment of the present invention.

FIG. 9 is a block diagram of broadcast selection unit 706 of FIG. 7 according to an embodiment of the present invention. In this embodiment, the number P of processing engines is 4; those skilled in the art will appreciate that broadcast selection unit 706 can be modified for use with any number of parallel requests. Broadcast selection unit 706 includes a priority encoder 902, a selection multiplexer 904, and comparison circuits 911, 912, 913. Priority encoder 902 receives the pending mask $V_0 \ldots V_3$ and identifies the position of the leading asserted bit (in this embodiment, $V_0$ is the leading bit). Selection multiplexer 904 receives the target addresses $A_0 \ldots A_3$.

Priority encoder 902 generates a control signal ($CTL_{Br}$) that directs selection multiplexer 904 to select the address $A_i$ corresponding to the leading asserted bit $V_i$ as a broadcast address $A_{Br}$. The broadcast address $A_{Br}$ is delivered to comparison circuits 911, 912, 913. Each comparison circuit also receives a different one of the addresses $A_i$ as shown. Comparison circuits 911-913 each compare the input address $A_i$ to the broadcast address $A_{Br}$. A broadcast signal $\beta_i$ is asserted if the addresses $A_i$ and $A_{Br}$ match and deasserted otherwise. Comparison circuits 911-913, unlike comparison circuits 801-803, 812, 813 and 823 of FIG. 8, compare the full addresses (e.g., at least row field 406 and bank field 404 of address 400 of FIG. 4), not just the bank bits. In some embodiments, comparison circuits 911 also include pending-bit checking logic that receives the pending-mask bit $V_i$ corresponding to its input address; if the input address $A_i$ is inactive, then the broadcast bit $\beta_i$ is advantageously deasserted. The signals $\beta_i$ are sent to decision logic 708 as shown in FIG. 7.

It should be noted that in this embodiment, broadcast selection unit 706 does not include a comparison circuit for address $A_0$. Such a circuit is not needed because in this embodiment, address $A_0$ is always the highest priority address; if the request for address $A_0$ is pending, $A_0$ will be selected as the broadcast address. In one embodiment, broadcast signal $\beta_0$ is just the pending mask bit $V_0$; in another embodiment, an explicit $\beta_0$ signal is not used.

Figure 10:
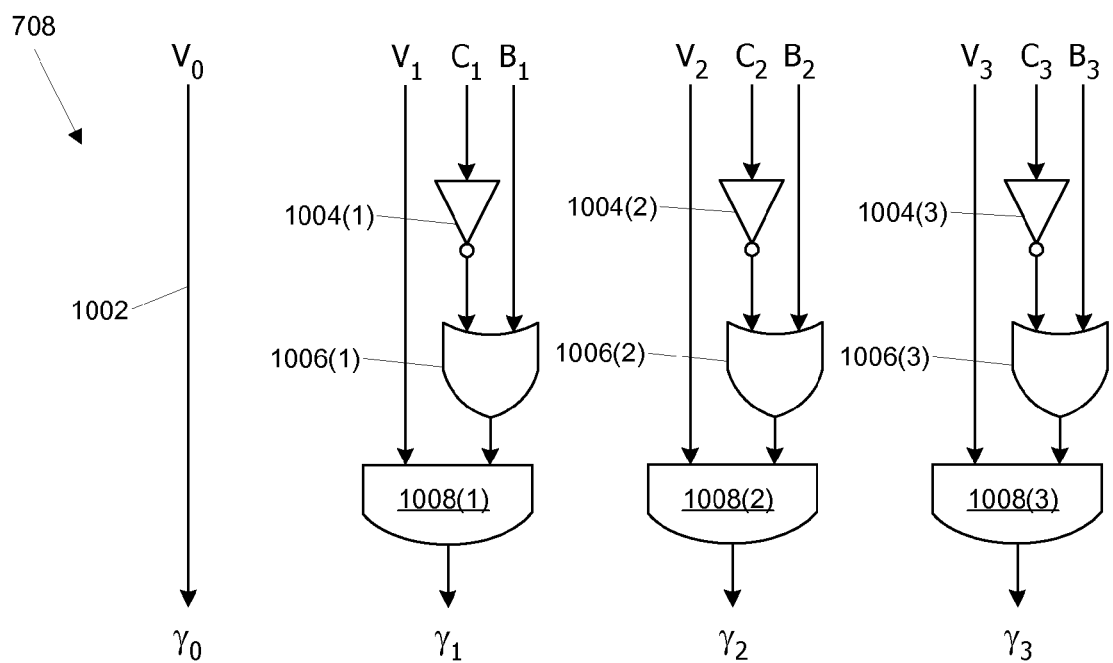
FIG. 10 is a block diagram of a decision logic unit for the address conflict logic subsystem of FIG. 7 according to an embodiment of the present invention.

FIG. 10 is a block diagram of decision logic 708 according to an embodiment of the present invention. In this embodiment, the number P of processing engines is 4; it is to be understood that the logic described herein can be modified for use with any number of processing engines. Decision logic 708 receives the pending mask $V_0 \ldots V_3$, the conflict signals $C_1 \ldots C_3$, and the broadcast signals $\beta_1 \ldots \beta_3$ and generates the go signals $\gamma^0 \ldots \gamma_3$. The go signal for the request from processing engine 202(*i*) is asserted if the request is satisfiable this cycle and deasserted otherwise. In this embodiment, the request targeting address $A_0$ has highest priority: if pending bit $V_0$ is asserted, then the request targeting $A_0$ is satisfiable. Accordingly, signal path 1002 sets $\gamma_0$ to match the (asserted or deasserted) state of $V_0$. Requests from processing engines 202(1), 202(2) and 202(3) are satisfiable if there is no conflict (i.e., if $C_i$ is deasserted) or if the address $A_i$ matches the broadcast address (i.e., if $\beta_i$ is asserted). Inverters 1004(*i*) invert the $C_i$ signals (producing signals $\underline{C}_i$), and OR gates 1006(*i*) determine the Boolean function ($\underline{C}_i$ OR $\beta_i$). The go signal $\gamma_i$ is asserted only if the request is pending; accordingly AND gates 1008 are used to generate the final go signals. Thus, for i>0, $\gamma_i = (\underline{C}_i \text{ OR } \beta_i) \text{ AND } V_i$.

Referring again to FIG. 7, decision logic 708 provides the go signals $\gamma_i$ to selection logic 710. Selection logic 710 transmits the address(es) $A_i$ for which the corresponding go signal $\gamma_i$ is asserted to address interconnect 312 for delivery to SRF 300 (FIG. 3). In some embodiments, all addresses $A_i$ are transmitted, along with the go signals $\gamma_i$, and address interconnect 312 ignores any address $A_i$ for which the go/no-go signal $\gamma_i$ is not asserted. Selection logic 710 also updates the pending mask $V_0 \ldots V_{P-1}$, e.g., by implementing the logic:

$V_i' = V_i \text{ AND } \underline{\gamma}_i$

That is, any request that was pending and not satisfiable on the current cycle remains pending; any request that was pending and satisfiable on this cycle ceases to be pending. In some embodiments, the updated pending mask $V_0' \ldots V_{P-1}'$ is delivered to instruction unit 212 (FIG. 2); if the pending mask includes at least one asserted bit, then instruction unit 212 issues the SRF access instruction again (with the new pending mask) before proceeding to the next instruction for the thread group.

It will be appreciated that the address conflict logic described herein is illustrative and that variations and modifications are possible. The logic circuits and other components described herein can be implemented using conventional integrated circuit or other techniques. In some embodiments where byte addressing is used, the conflict logic may be modified to detect instances in which two or more of the target addresses correspond to different bytes within the same entry (e.g., word) and to treat such requests as non-conflicting. For example, the entire word could be delivered to each requesting processing engine regardless of which byte (or bytes) was requested by a particular processing engine, and each processing engine could extract the desired portion of the word.

It should also be noted that the logic described herein may be modified for use with any number P of parallel processing engines. For instance, conflict detection logic 702 can be modified to include P(P−1)/2 parallel comparison circuits, each of which advantageously compares only the $\log_2 B$ bank bits of the input addresses. In one embodiment, P=B=16, and conflict detection logic 702 includes 1204-bit comparison circuits. Similarly, broadcast selection logic 704 can be modified to include P−1 parallel comparison circuits operating on the full addresses of the inputs (e.g., a 12-bit word address).

In embodiments where the number P of parallel requests exceeds the number B of banks 302 in SRF 300, every set of P parallel requests will generate at least one conflict. In the case where all P requests target the same address, the broadcast logic described above would still allow all P requests to be handled in a single access cycle. In embodiments where B is at least as large as P, it is possible for all P requests to be handled in a single access cycle as long as all requests target either the broadcast address or addresses in different banks from any other address. Thus, embodiments where B>P can provide certain advantages in processing efficiency and overall throughput. (Suitable code optimizations can further reduce the occurrence of conflicts for at least some programs; such optimizations are not critical to the present invention.)

The time required to process a single access request using address conflict logic 310 is generally proportional to the largest number of requests that target different addresses in a single bank, which determines the number of times the SRF access instruction is issued. In some embodiments, a "multicast" mode with two or more broadcast addresses, each associated with a different subset of the requests, is provided. A multicast mode can be implemented, e.g., by using multiple copies of the broadcast logic described above, along with additional circuitry to ensure that the two (or more) multicast addresses are in different banks from each other. The extent to which different processing engines issue parallel requests that target the same address depends on the particular application, and thus any further advantage gained by implementing a multicast mode would be application-dependent.

In still other embodiments, the broadcast logic can be omitted entirely. To the extent that processing engines issue parallel requests targeting the same address, efficiency may be reduced, but acceptable performance can still be obtained.

The address conflict logic described herein can be used for both read and write requests. In the case of a write request, any broadcast (or multicast) logic is advantageously disabled to prevent two different processing engines from attempting to write to the same location at the same time. It should be noted that a SIMD group of write requests can include multiple requests targeting the same address. In the embodiment described above, the request with the highest processing engine identifier i would be satisfied last; consequently, after execution of the write instruction, a multiply-targeted location would predictably contain the data written in response to that request. Those skilled in the art will appreciate that other rules for serializing access in the event of a conflict, including other priority rankings, could also be implemented. Accordingly, to the extent that the programmer does not know the applicable serialization rule or control the assignment of threads to processing engines, the programmer advantageously does not rely on this aspect of system behavior in designing code. Further, in instances where SRF 300 is shared by threads of multiple SIMD groups (e.g., in the case of a CTA with more than P threads), the order in which threads in different SIMD groups execute a write instruction may also be out of the programmer's control, and the programmer advantageously designs program code such that multiple writes to the same address do not occur in parallel.

In some embodiments, the instruction issue unit 212 of core 210 advantageously issues the SRF access instruction repeatedly until all requests have been satisfied before going on to the next instruction for the SIMD group. Instructions from other SIMD groups might or might not be interleaved with repeated SRF access instructions, depending on implementation. In such embodiments, execution of an SRF access instruction is implicitly synchronized across a SIMD group. For instance, if the threads of a SIMD group each write data to SRF 300, then read data from SRF 300 that was written by another thread in the same group, there is no need for explicit synchronization, as all writes for the group would complete before any reads are issued, and consequently each thread will read the correct data. Across different SIMD groups, however, this behavior is not guaranteed, and explicit synchronization instructions in the program code (e.g., as described in above-referenced application Ser. No. 11/305,178) are advantageously used as needed to maintain coherence of shared data.

Address and Data Interconnect

Referring again to FIG. 3, processing engines 202 communicate with SRF 300 via an address interconnect 312 and a data interconnect 314, examples of which will now be described. As noted above, address interconnect 312 receives from address conflict logic 310 a set of target addresses that includes no more than one address per SRF bank 302. In some embodiments, the set may include anywhere from 1 to B addresses, where B is the number of banks 302, although if the number P of processing engines 202 is less than B, the set is limited to P addresses. Address interconnect 312 reads the bank bits of each address in the set and routes each address to the row decoder 304 of the appropriate bank.

Figure 11:
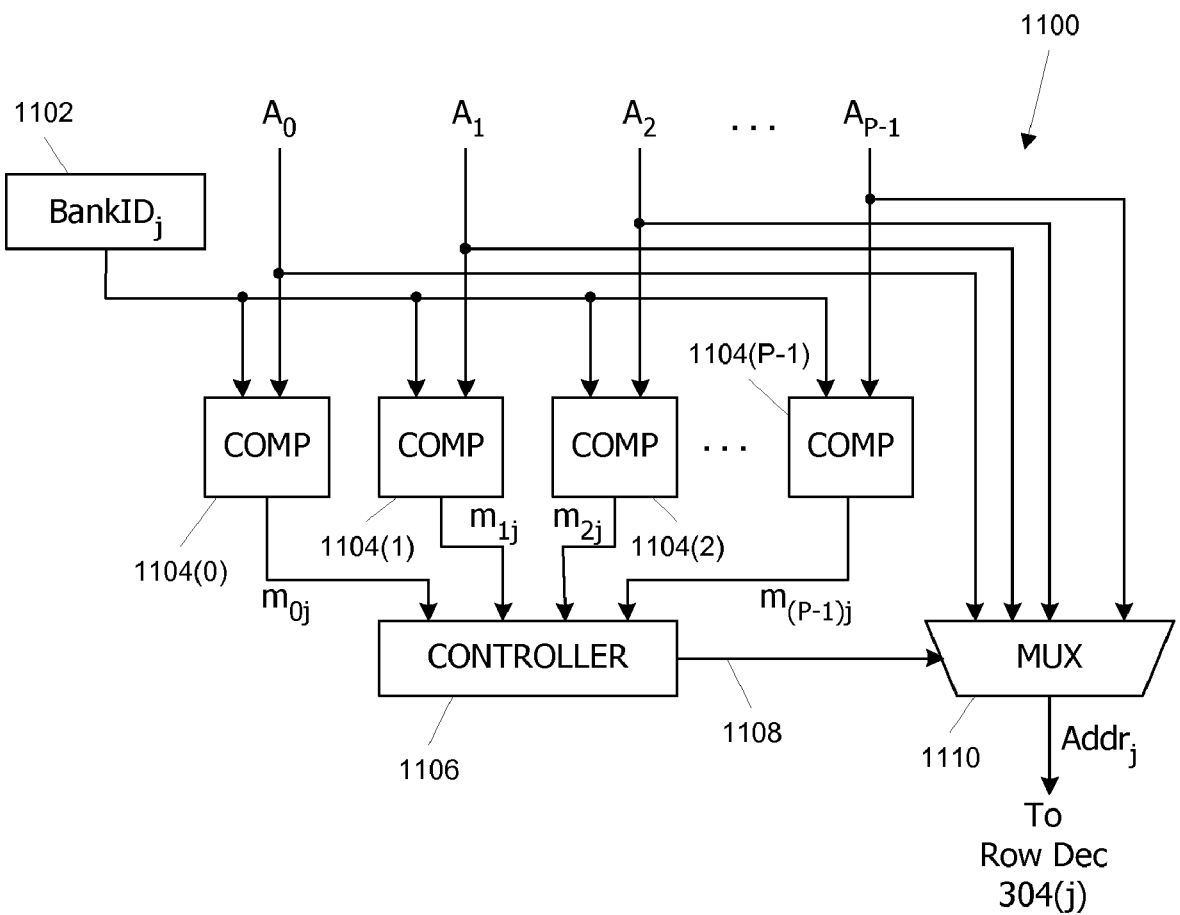
FIG. 11 is a block diagram of a bank steering unit for an address interconnect for a shared memory according to an embodiment of the present invention.

FIG. 11 is a block diagram of a bank steering unit 1100 for address interconnect 312 according to an embodiment of the present invention. Bank steering unit 1100 selects the address that will be used to access SRF bank $302(j)$. Address interconnect 312 advantageously includes B copies of bank steering unit 1100, one for each bank $302(j)$ in SRF 300. Bank steering unit 1100 includes a register (or other storage circuit) 1102 that is pre-loaded with a bank identifier $BankID_j$, that identifies one of the B banks. In one embodiment, bank identifiers $BankID_j$ correspond to the possible values of bit field 404 in address 422 of FIG. 4. It is to be understood that each copy of bank steering unit 1100 has a similar register 1102 with a different bank identifier $BankID_j$.

Steering unit 1100 also includes P comparison circuits 1104, each of which compares the bank bits (e.g., bank field 404 of FIG. 4) of one of the P addresses $A_0 \ldots A_{P-1}$ received from address conflict logic 310 to bank identifier $BankID_j$. Each comparison circuit 1104 produces a one-bit output $m_{ij}$ which is asserted if the bank identifier $BankID_j$ is matched and deasserted otherwise. Controller 1106 receives the P comparison outputs $m_{ij}$. Based on which of the $m_{ij}$ signals is asserted, controller 1106 determines which address $A_0 \ldots A_{P-1}$ corresponds to an entry in bank $302(j)$ and generates a corresponding control signal on path 1108. A P:1 selection multiplexer 1110 responds to the control signal on path 1108 by passing through the selected address as $Addr_j$. The address $Addr_j$ is delivered to row decoder $304(j)$ of FIG. 3.

It should be noted that in some instances, the input addresses $A_0 \ldots A_{P-1}$ might include multiple copies of the same address. For instance, if multiple addresses match the broadcast address selected by address conflict logic 310 described above, multiple copies of the broadcast address might be delivered to bank steering unit 1100. Thus, more than one of the comparison outputs $m_{ij}$ might be asserted at the same time. As long as address conflict logic 310 guarantees that no more than one address per bank will be supplied to address interconnect 1100, it can be assumed that all addresses $A_i$ for which the comparison output $m_{ij}$ is asserted are identical. Accordingly, controller 1106 may control multiplexer 1110 with control signal 1108 to select any one of the addresses for which the comparison result $m_{ij}$ is asserted. For instance, controller 1106 could be implemented as a priority encoder that selects the address $A_i$ with the lowest processing engine identifier i for which the comparison output $m_{ij}$ is asserted.

It will be appreciated that the address interconnect described herein is illustrative and that variations and modifications are possible. In some embodiments, controller 1106 may also receive the go signals $\gamma_i$ for each address and may ignore the comparison output $m_{ij}$ for any address $A_i$ for which the corresponding go signal $\gamma_i$ is not asserted.

Referring again to FIG. 3, because address conflict logic 310 passes through no more than one address per bank, each row decoder 304 receives no more than one address in a given cycle. Each row decoder 304 decodes its received address and accesses the appropriate entry in its associated bank 302. During a read (e.g., load.shared) operation, the read data is delivered to the inputs of data interconnect 314. Thus, data interconnect 314 in this embodiment can receive up to B data values (e.g., 32 bits each) per cycle. Data interconnect 314 routes each of the received data values to the appropriate processing engine(s) 302.

Figure 12:
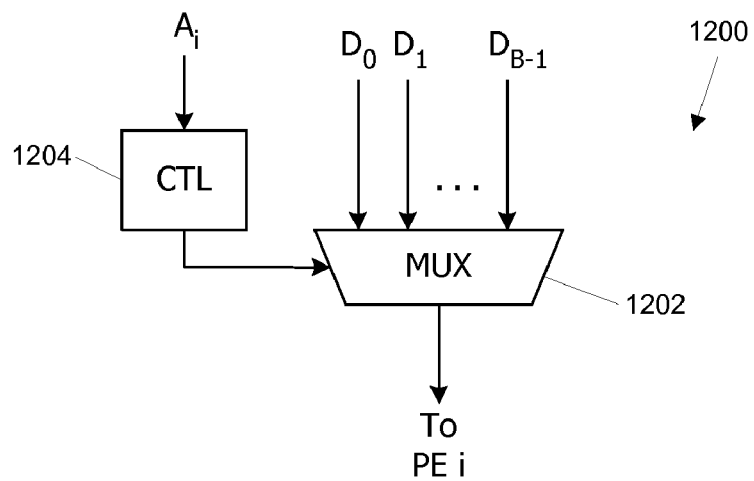
FIG. 12 is a block diagram of a data steering unit for a data interconnect for a shared memory according to an embodiment of the present invention.

FIG. 12 is a block diagram of a data steering unit 1200 for data interconnect 314 according to an embodiment of the present invention. Data interconnect 314 advantageously includes P copies of data steering unit 1200, one associated with each processing engine 202. Data steering unit 1200 includes a B:1 selection multiplexer 1202 that selects one of the B data values $D_0 \ldots D_{B-1}$ for delivery to the corresponding processing engine 202($i$). For a read operation, multiplexer 1202 is advantageously controlled by a control circuit 1204 that is responsive to the address $A_i$ requested by processing engine 202($i$). In one embodiment, control circuit 1204 extracts the bank bits (e.g., field 404 of FIG. 4) from address $A_i$ and selects the data $D_j$ from the corresponding SRF bank 302 for delivery to processing engine 202($i$).

It should be noted that in a data interconnect 314 with P parallel copies of data steering circuit 1200, the same data word $D_j$ can be selected for delivery to any number of processing engines 202. Thus, the data from the broadcast address $A_{Br}$ can be delivered in parallel to every processing engine 202 for which $A_{Br}$ is the target address, allowing data interconnect 314 to broadcast (or multicast) the same data to appropriate processing engines 202 without using the broadcast mask (or multicast masks) generated by address conflict logic 310.

Similarly to the address interconnect of FIG. 11, control circuit 1204 may also be configured to receive the go signal $\gamma_i$ associated with the request from processing engine 202($i$) and may block the data delivery operation if the go signal $\gamma_i$ is deasserted.

In some embodiments, a separate write interconnect (not explicitly shown) can be provided for delivery of data to the banks 302 of SRF 300 during a write (e.g., store.shared) operation. Design of such an interconnect is within the ability of those of ordinary skill in the art with access to the present teachings, and a detailed description is omitted.

Figure 13:
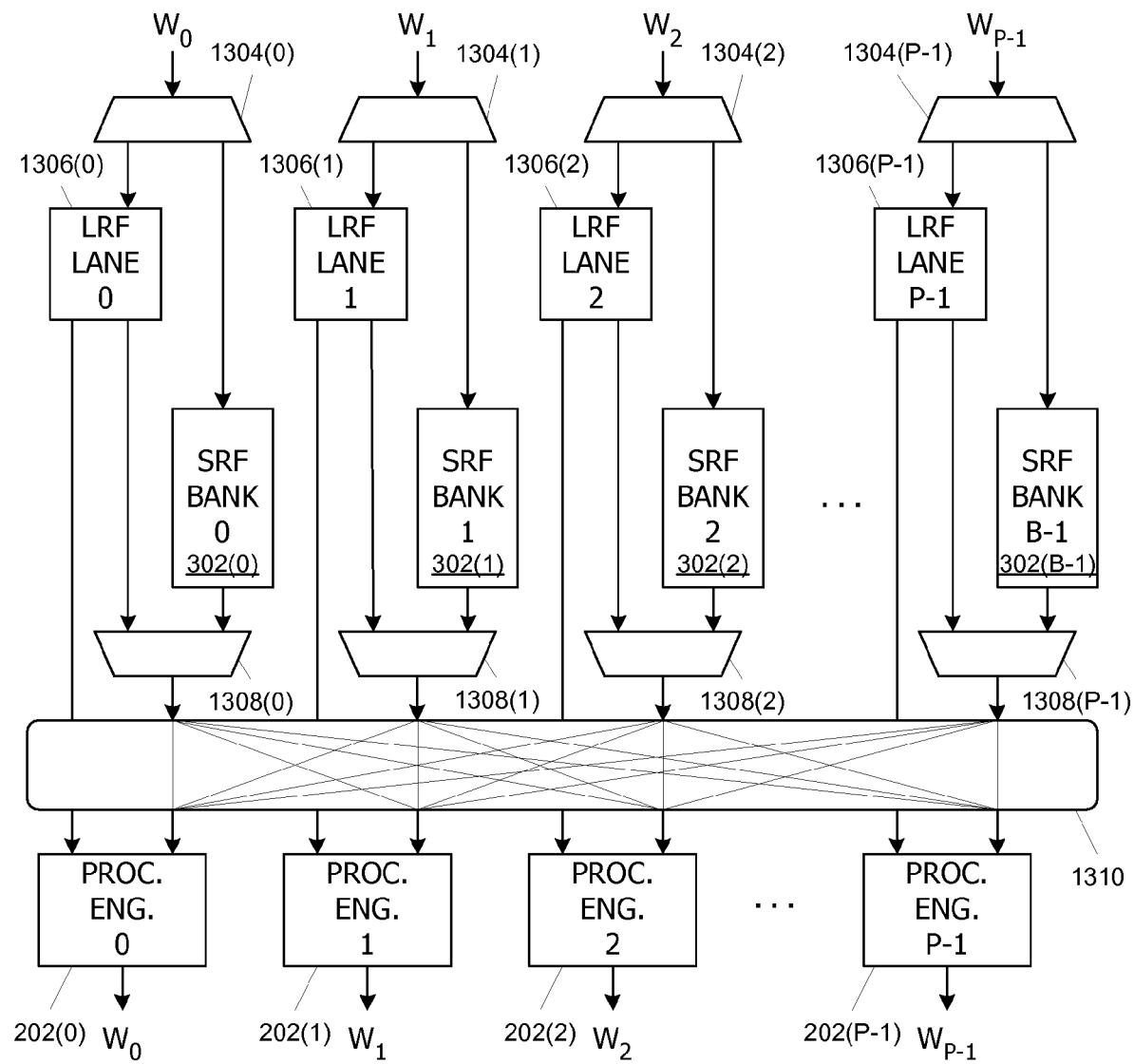
FIG. 13 is a simplified block diagram illustrating a shared register file and local register file system according to an embodiment of the present invention.

In other embodiments, read data interconnect 314 is advantageously leveraged to perform write operations, avoiding the need for a second data interconnect. FIG. 13 is a simplified block diagram illustrating an SRF/LRF system 1300 for the case where B=P according to one embodiment of the present invention. SRF/LRF system 1300 supports a load.shared operation that transfers data from SRF 300 to local register file (LRF) 204 (FIG. 2) and a store.shared operation that transfers data from LRF 204 to SRF 300. This is accomplished in part by integrating portions of the read and write paths for LRF 204 with the corresponding paths for SRF 300. Thus, as shown, SRF/LRF system 1300 includes an LRF lane 1306 assigned to each processing engine 202 as well as an SRF bank 302 associated with each processing engine 202.

In this embodiment, processing engine 202(0) is coupled to deliver write data to a direct write path $W_0$ (implementing write path 316(0) of FIG. 3) that connects to a write steering circuit 1304(0). (It is to be understood that each write path $W_i$ shown at the top of FIG. 13 is a direct continuation of the respective write path $W_i$ shown at the bottom of FIG. 13; the connected lines have been omitted for clarity.) In response to a control signal (not explicitly shown), write steering circuit 1304(0) steers the data either into the LRF lane 1306(0) assigned to processing engine 202(0) or into bank 302(0) of SRF 300. Write path $W_0$ is a direct path, meaning that the path includes no crossbar or other interconnect to other SRF banks 302. The other processing engines 202 are similarly coupled; thus, each processing engine 202 can write directly to exactly one bank 302 of SRF 300.

LRF lane 1306(0) and SRF bank 302(0) are also both coupled to a read selection circuit 1308(0). In response to a control signal (not explicitly shown), read selection circuit 1308(0) selects between an output from LRF lane 1306(0) and an output from SRF bank 302(0). The selected data is provided to a $D_0$ input of a data interconnect 1310, which may be implemented, e.g., in the manner described above with reference to FIG. 12. Similarly, other pairs of LRF lanes 1306($i$) and SRF banks 302($i$) are coupled to respective read selection circuits 1308($i$), which provide data to respective $D_i$ inputs of data interconnect 1310.

Figure 14:
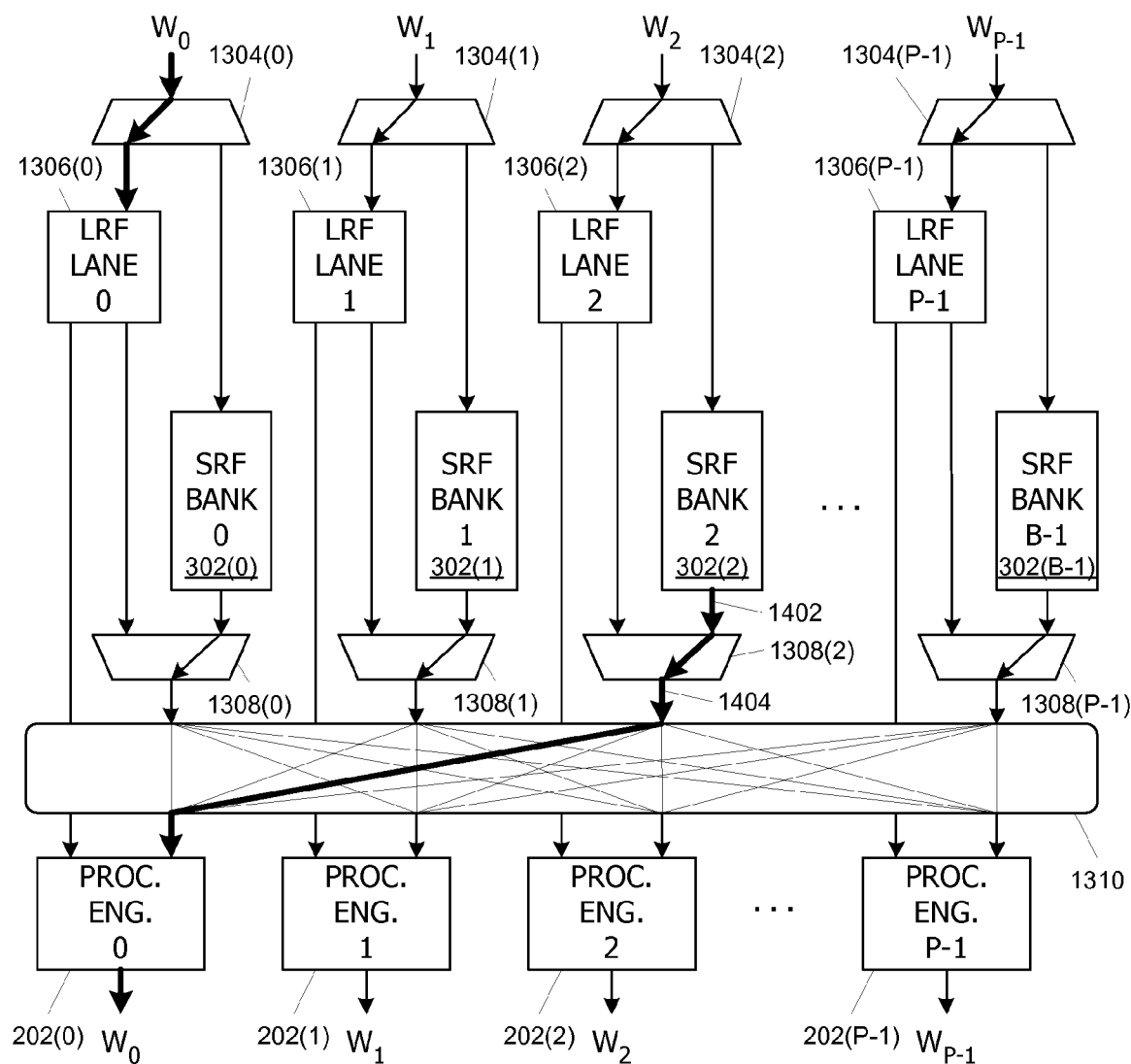
FIG. 14 illustrates a load operation for transferring data from a shared register file to a local register file in the system of FIG. 13.

Each processing engine 202 in FIG. 13 can load data from any SRF bank 302 into its LRF lane 1306. For example, FIG. 14 illustrates a load.shared operation for processing engine 202(0) in SRF system 1300. During a load.shared operation, all read selection circuits 1308 are advantageously configured to select data from SRF banks 302 for delivery to data interconnect 1310, and all write steering circuits 1304 are advantageously configured to steer data from the direct write paths $W_j$ into LRF lanes 1306.

In FIG. 14, data paths used for loading data from SRF bank 302(2) to LRF lane 1306(0) assigned to processing engine 202(0) are highlighted. These paths would be used, e.g., when processing engine 202(0) executes a load.shared instruction targeting an address $A_0$ that is in SRF bank 302(2) or when processing engine 202(0) executes an instruction that fetches a source operand from SRF bank 302(2). In response to shared-memory address $A_0$ (not explicitly shown in FIG. 14), SRF bank 302(2) delivers data on path 1402 to read selection circuit 1308(2), which directs the SRF data via path 1404 to a $D_2$ input of data interconnect 1310. Data interconnect 1310 delivers the data to processing engine 202(0), which loads the data via direct write path $W_0$ and write steering circuit 1304(0) into LRF lane 1306(0).

It is to be understood that other load operations may be performed in parallel with the load from SRF bank 302(2) to LRF lane 1306(0). For instance, data from SRF bank 302(0) might be loaded into LRF lane 1306(2) or into any LRF lane other than LRF lane 1306(0), which is being loaded with data from SRF bank 302(2). Similarly, data from any SRF bank 302 (including SRF bank 302(2)) might be loaded into LRF lane 1306(2) in parallel with the load from SRF bank 302(2) to LRF lane 1306(0).

Figure 15:
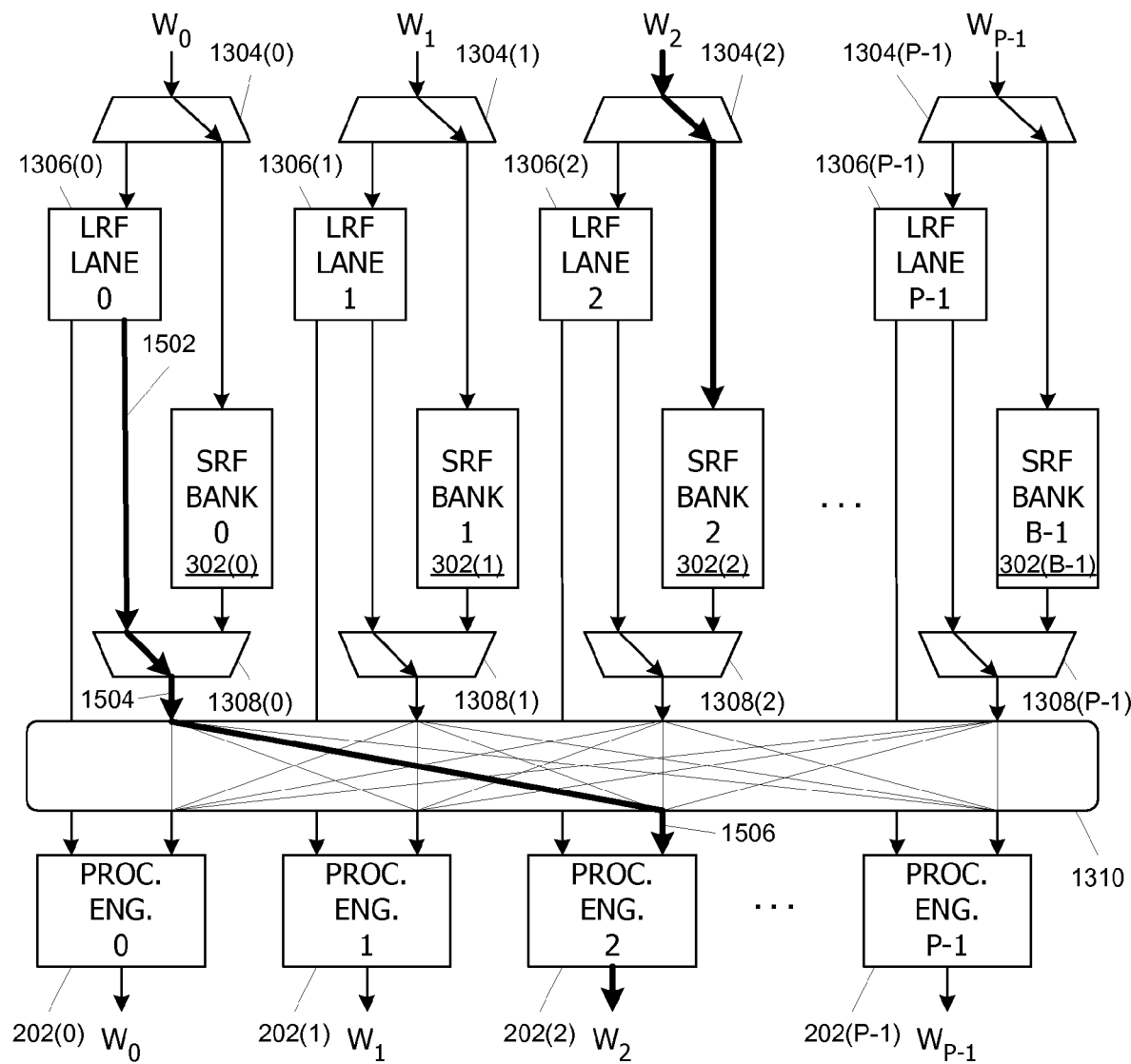
FIG. 15 illustrates a store operation for transferring data from a local register file to a shared register file in the system of FIG. 13.

Each processing engine 202 in FIG. 13 can also store data from its LRF lane 1306 to any SRF bank 302 by enlisting another processing engine as a "surrogate." For example, FIG. 15 illustrates a store.shared operation for processing engine 202(0) in SRF system 1300. During a store.shared operation, all read selection circuits 1308 are advantageously configured to select data from LRF lanes 1306 for delivery to data interconnect 1310, and all write steering circuits 1304 are advantageously configured to steer data from the direct write paths $W_j$ into SRF banks 302.

In FIG. 15, data paths used for storing data from LRF lane 1306(0) to SRF bank 302(2) are highlighted. These paths would be used, e.g., when processing engine 202(0) executes a store.shared instruction or another output instruction targeting an address $A_0$ that is in SRF bank 302(2). In a first stage of the process, LRF lane 1306(0) delivers the write data via a path 1502 to read selection circuit 1308(0), which directs the data to a $D_0$ input of data interconnect 1310 via a path 1504.

Data interconnect 1310 advantageously delivers the write data to the surrogate processing engine, i.e., the processing engine 202 whose direct write path $W_i$ couples to the desired SRF bank 302. In this example, processing engine 202(2) is the surrogate and receives the write data via a path 1506. Processing engine 202(2) writes the data into SRF bank 302(2) via direct write path $W_2$ and write steering circuit 1304(2). In some embodiments, processing engine 202(2) passes the write data through its pipelined data path; in other embodiments, processing engine 202(2) has a low-latency bypass path for write data, allowing the write data to bypass the pipelined data path.

It is to be understood that other store operations may be performed in parallel with the store from LRF lane 1306(0) to SRF bank 302(2). For instance, data from LRF lane 1306(2) might be stored into SRF bank 302(0) or into any SRF bank other than SRF bank 302(2), which is in the process of storing data from LRF lane 1306(0). Similarly, data from any LRF lane 1306 (except lane 1306(0), which is providing data to SRF bank 302(2)) might be stored into SRF bank 302(0) in parallel with the store from LRF lane 1306(0) to SRF bank 302(2).

In some instances, a processing engine 202 may act as its own surrogate during a store operation. For example, processing engine 202(1) might store data from LRF lane 1306(1) to an address $A_1$ that happens to be in SRF bank 302(1). The LRF data would be delivered to processing engine 202(1) via read selection circuit 1308(i) and data interconnect 1310, then delivered via direct write path $W_1$ and write steering circuit 1304(1) to SRF bank 302(1).

Data interconnect 1310 can be implemented similarly to read data interconnect 314 described above. In one embodiment, data interconnect 1310 includes P copies of steering unit 1200 of FIG. 12. Control circuit 1204 in this embodiment is advantageously configured such that during a load (or other read) operation, the target address $A_i$ of the request from processing engine 202(i) is used to determine which bank's data should be selected and such that during a store (or other write) operation, the target address $A_j$ that is in the bank 202(i) associated with the processing engine 202(i) is used, regardless of which processing engine 202(j) was the source of the request.

Figure 16:
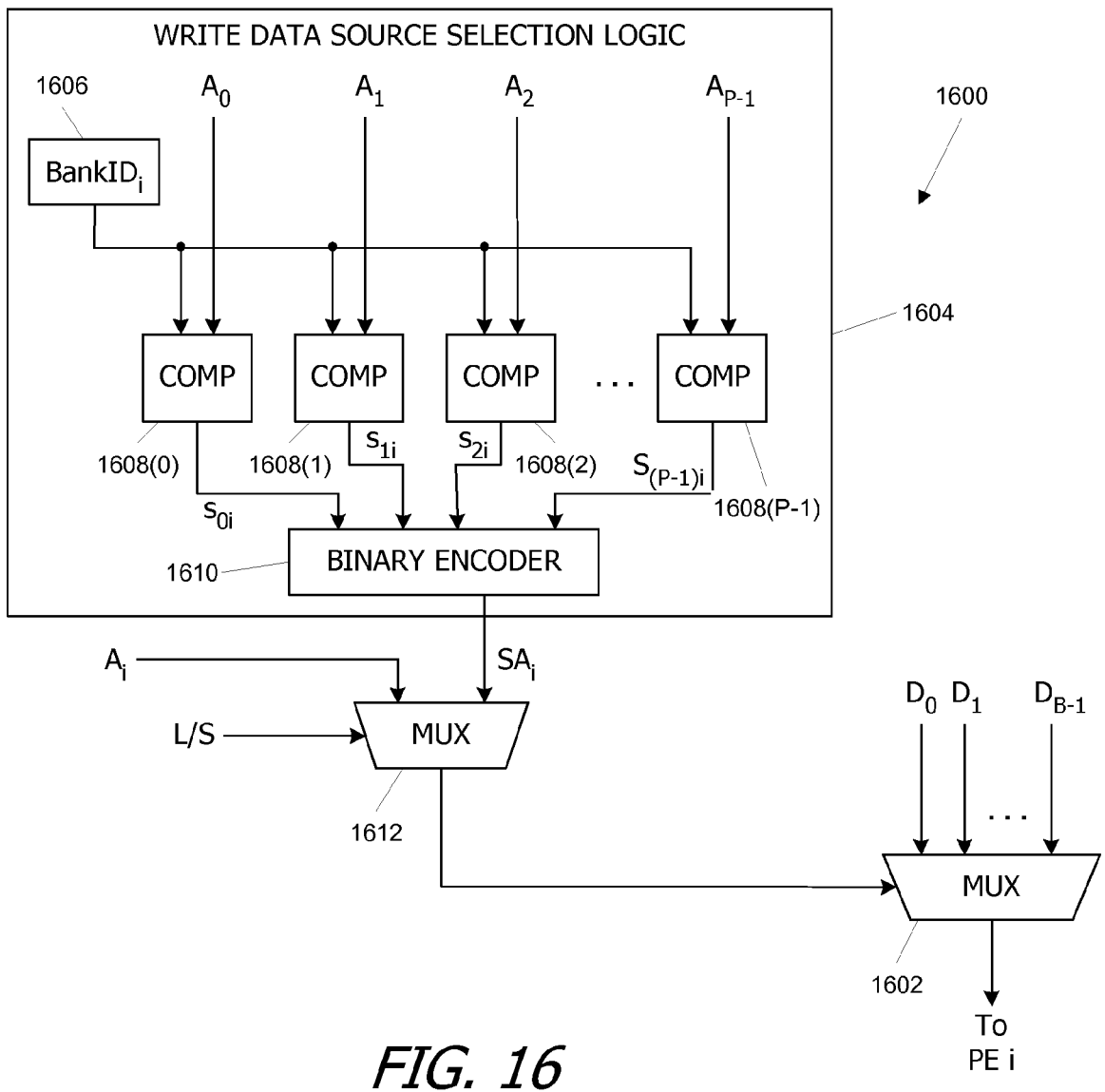
FIG. 16 is a block diagram of a data steering circuit 1600 for data interconnect 1310 according to an embodiment of the present invention.

More specifically, FIG. 16 is a block diagram of a data steering circuit 1600 for data interconnect 1310 according to an embodiment of the present invention. It is to be understood that data interconnect 1310 may have P parallel copies of data steering circuit 1600. Data steering circuit 1600, similarly to steering circuit 1200 of FIG. 12, includes a B:1 multiplexer 1602 that selects one of the B data words $D_j$ received from SRF banks 302 for delivery to processing engine 202(i).

The control signal used to control multiplexer 1602 in this embodiment depends on whether a load.shared or store.shared operation is in progress. For a load operation, the bank bits from the target address $A_i$ of the request from processing engine 202(i) are used to determine which data should be passed through to processing engine 202(i). For a store operation, source-bank-identifying bits $SA_i$ provided by a write data source selection logic module 1604 are used. The selection between $A_i$ and $SA_i$ is made by a multiplexer 1612 controlled by a L/S signal indicative of whether the current operation is a load or a store.

Write data source selection logic module 1604 is advantageously configured somewhat similarly to address steering unit 1100 of FIG. 11. A register 1606 stores the bank identifier (BankID$_i$) of the SRF bank 302(i) to which surrogate processing engine 202(i) can write directly via direct write path $W_i$. P comparison circuits 1608 compare the bank bits of each of the P target addresses $A_k$ to the bank identifier BankID$_i$. Each comparison circuit 1608(k) generates an output signal $S_{ki}$ that is asserted if the bank bits of the target address $A_k$ (e.g., bank field 404 of FIG. 4) match the bank identifier BankID$_i$ and deasserted otherwise. Binary encoder unit 1610 determines, based on the outputs $S_{ki}$ of all comparison circuits 1608, which of the target store addresses $A_k$ is in SRF bank 302(i) and generates the corresponding source-bank-identifying bits $SA_i$.

It should be noted that if the broadcast option in address conflict logic 310 is disabled during a write operation, no more than one of the addresses $A_k$ will match the bank identifier BankID$_i$. Thus, two processing engines do not attempt to write to the same bank on the same cycle.

It will be appreciated that the data interconnect described herein is illustrative and that variations and modifications are possible. Those skilled in the art will recognize that using a single interconnect to support both read and write operations can reduce chip area, cost, and/or power consumption as compared to having separate interconnects for read data and write data. In addition, if the shared and local register files are implemented in the same memory devices (e.g., SRAMs), read selection circuits 1308 can be omitted.

It should also be noted that in some embodiments, all data transfers from shared memory to the LRF or vice versa involve passing the data through the pipeline of one of the processing engines. Consequently, the processing engine through which the data passes can perform operations on the data before sending it out on the direct write path. For instance, one operational sequence might include reading data from SRF 300 into a processing engine 202, performing an operation, then writing the result of the operation (rather than the read data) to LRF lane 1306.

Further, while the data interconnect has been illustrated for the case where B=P, the invention is not limited to this special case. For instance, if B<P fewer than all of the processing engines might have direct write paths to SRF banks. If B>P, some write steering circuits might be configured to deliver data into either of two (or more) SRF banks in addition to an LRF lane. As long as at least one direct write path couples to each SRF bank, any processing engine will be able to write to any SRF bank.

In some embodiments, the configuration of FIG. 13 can also be used to support pixel swizzle operations during execution of a pixel shader. Such operations may include any operation in which processing of one pixel uses data generated from processing of a neighboring (e.g., adjacent) pixel. For example, as is known in the art, a shader algorithm may be dependent on a derivative of some attribute of the primitive at the pixel location. The derivative at the pixel location can be approximated based on the difference in the value of the attribute between adjacent pixels.

Figure 17:
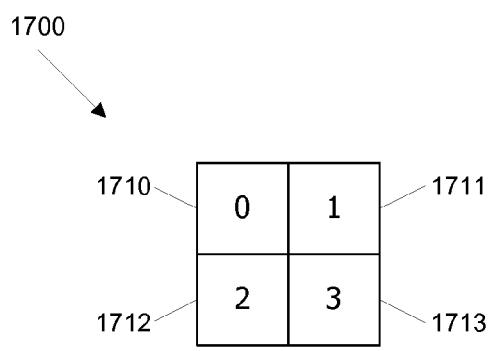
FIG. 17 illustrates a quad of pixels for which a swizzle operation is implemented according to an embodiment of the present invention.

In some embodiments, pixels are loaded into core 210 of FIG. 2 according to quads, where a "quad" is a 2×2 blocks of adjacent pixels. One quad might occupy, e.g., processing engines 202(0)-202(3). FIG. 17 illustrates a quad 1700 having pixels 1710-1713; the processing engine identifier (0-3) assigned to each position in quad 1700 is indicated. Depending on the number P of processing engines 202, multiple quads can be processed in a single SIMD group. For instance, if P is 16, each SIMD group can include up to four quads. As long as all pixels of a quad are in the same SIMD group and the processing engines are assigned to pixels of a quad in a predictable manner, the swizzle technique described herein can be used regardless of the number of processing engines.

In one example of a swizzle operation, data related to one pixel in quad 1700 is provided to a different processing engine that is processing another pixel in the same quad. For example, referring to FIGS. 17 and 13, suppose that attributes of pixel 1710 of quad 1700 are present in LRF lane 1306(0), attributes of pixel 1711 are present in LRF lane 1306(1), and so on. By suitably configuring read selection circuits 1308, data interconnect 1310, and write steering circuits 1304, a pixel attribute for pixel 1710 can be delivered from LRF lane 1306(0) to LRF lane 1306(1), and in parallel, a pixel attribute for pixel 1711 can be delivered from LRF lane 1306(1) to LRF lane 1306(0). More specifically, for a swizzle operation, all read selection circuits 1308 are configured to select data from the corresponding LRF lane 1306, and all write steering circuits are configured to steer data into LRF lanes 1306. Data interconnect 1310 operates as it would for a store.shared operation. A four-way swizzle around a quad or other patterns of data exchange are also possible.

The swizzle technique described herein can also be extended to pixel groups larger than quads, so long as the size of the pixel group does not exceed the size of a SIMD group and so long as the assignment of pixels in the group to processing engines is managed in a predictable way such that the pixel shader can be coded to reliably specify the appropriate source and destination locations for each swizzle operation.

Further Embodiments

While the invention has been described with respect to specific embodiments, one skilled in the art will recognize that numerous modifications are possible. For instance, while the descriptions above may make reference to specific hardware or software components, it will be appreciated that the various logic operations could be implemented using any combination of hardware and/or software.

As noted above, embodiments where the number B of banks in the shared memory is at least as large as the number P of parallel processing engines provide increased likelihood that a group of parallel memory requests can be satisfied in parallel. The present invention, however, is not limited to such embodiments, and B may be greater than, equal to, or less than P as desired; access to shared memory can be serialized to the extent needed in any given case.

A shared memory in accordance with the present invention can be implemented using a variety of memory technologies, including but not limited to conventional technologies such as SRAM (static random access memory), DRAM (dynamic random access memory), cache structures, and the like. In some embodiments, a shared register file and a local register file are both implemented using SRAM, and the SRF and LRF can be in different sections of the same SRAM. Where this is the case, lanes in the LRF might also be independently addressable; however, SIMD instruction issue generally has the property that corresponding locations in the LRF lanes are accessed in parallel, so independently-addressable LRF lanes might not be exploited. Those skilled in the art will recognize, however, that SRF and LRF could in principle be merged into a single shared memory, portions of which are reserved for per-thread local storage.

Further, while the SRF embodiments described herein implement banks as single-ported RAMs, one or more multi-ported memories could also be used to implement a shared memory, at some additional cost in terms of chip area.

Thus, although the invention has been described with respect to specific embodiments, it will be appreciated that the invention is intended to cover all modifications and equivalents within the scope of the following claims.

What is claimed is:

1. A processor core comprising:
   a shared memory having a plurality of addressable storage locations;
   a plurality of processing engines each adapted to execute a different thread of a group of threads in parallel, each thread of the group of threads including at least one instruction that, when executed, results in an access to a target one of the addressable storage locations in the shared memory; and
   an interconnect circuit coupling the plurality of processing engines to the shared memory such that any one of the addressable storage locations in the shared memory is readable and writeable by any one of the processing engines, wherein the interconnect circuit is adapted such that first data read from the shared memory by a selected one of the processing engines and second data written to the shared memory by the selected one of the processing engines is transferred through at least a portion of the interconnect circuit in a same direction during both read operations and write operations.

2. The processor core of claim 1 wherein the interconnect circuit is further adapted such that the same direction is a direction from the shared memory to the processing engines.

3. The processor core of claim 1 wherein the shared memory is a shared cache memory.

4. The processor core of claim 1 wherein the shared memory includes a plurality of banks, each bank including a subset of the addressable storage locations.

5. The processor core of claim 4 wherein the interconnect circuit includes a data interconnect adapted to deliver data from the plurality of banks in parallel to more than one of the processing engines, wherein the data interconnect is further adapted to selectably transfer data received from any one of the banks to any one of the processing engines.

6. The processor core of claim 5 wherein the data interconnect includes a crossbar circuit.

7. The processor core of claim 5 further comprising an address interconnect circuit adapted to deliver respective target address in parallel from different ones of the plurality of processing engines to different ones of the plurality of banks, wherein a target address from any one of the plurality of processing engines is deliverable to any one of the banks.

8. The processor core of claim 4 further comprising:
   a plurality of local register file lanes, each local register file lane being assigned to a different one of the processing engines.

9. The processor core of claim 8 further comprising:
   a first write path coupling a surrogate one of the processing engines to deliver write data to a first one of the banks, wherein during a write operation, the interconnect circuit is configurable to deliver data associated with a write request targeting a location in the first one of the banks from the local register file associated with a source one of the processing engines to the surrogate one of the processing engines.

10. The processing core of claim 8 wherein the number of banks in the shared memory is equal to the number of processing engines and wherein each bank is associated with a different one of the processing engines, the processing core further comprising:
   a plurality of read selection circuits, each read selection circuit being coupled to receive data from a respective one of the local register file lanes and from a respective one of the banks of the shared memory, each read selection circuit being adapted to select between received data from the local register file lane and received data from the shared memory bank, each read selection circuit being further adapted to deliver the selected data to a respective input of a data crossbar; and a plurality of write steering circuits, each write steering circuit being coupled to receive data from a respective one of the processing engines, each write steering circuit being adapted to steer data received from the respective one of the processing engines selectably to either the local register file lane assigned to the respective one of the processing engines or the one of the banks of the shared memory associated with the respective one of the processing engines.

11. The processor core of claim 4 further comprising a plurality of write paths equal in number to the plurality of banks, each write path coupling a different one of the banks to receive write data from one of the processing engines.

12. The processor core of claim 11 wherein the number of banks is equal to the number of processing engines.

13. The processor core of claim 12 wherein each write path couples a different one of the processing engines to a different one of the banks.

14. A method of writing data to a shared memory in a processor having an array of parallel processing engines, the method comprising:
  identifying a write-source location for write data, the write-source location being a local storage location associated with a source processing engine of the array of parallel processing engines;
  identifying a write-target location in the shared memory to which the write data is to be written, the write-target location being writeable via a direct path by a surrogate processing engine of the array of parallel processing engines;
  transferring the write data from the write-source location to the surrogate processing engine via an interconnect circuit adapted to selectably deliver data from any location in the shared memory or any local storage location to any one of the processing engines, wherein the interconnect circuit is adapted such that the write data to be written to the shared memory by the surrogate processing engine and read data read from the shared memory by a destination processing engine of the array of processing engines are transferred through at least a portion of the interconnect circuit in a same direction during both read operations and write operations; and
  operating the surrogate processing engine to write the write data via the direct path to the write-target location in the shared memory.

15. The method of claim 14 wherein the write-source location is a location in a local register file associated with the source processing engine.

16. The method of claim 15 wherein transferring the write data includes:
  delivering the write data from the write-source location to a selection circuit that selects between data from the local register file associated with the source processing engine and data from a location in the shared memory;
  operating the selection circuit to deliver the write data to the interconnect circuit; and
  operating the interconnect circuit to deliver the write data to the surrogate processing engine.

17. The method of claim 14 further comprising performing a read operation to read data from the shared memory, the read operation including:
  identifying a read-source location in the shared memory, the read-source location storing read data;
  identifying a read-target location to which the read data is to be delivered, the read-target location being associated with the destination processing engine of the array of parallel processing engines;
  transferring the read data from the read-source location to the destination processing engine of the array of parallel processing engines via the interconnect circuit; and
  operating the destination processing engine of the array of parallel processing engines to load the read data into the read-target location.

18. A method of writing data to a shared memory in a processor having an array of parallel processing engines, the method comprising:
  identifying, in parallel, a first source location for first data to be written and a second source location for second data to be written, the first source location and the second source location being associated, respectively, with a first source processing engine of the array of parallel processing engines and a second source processing engine of the array of parallel processing engines;
  identifying, in parallel, a first target location for the first data and a second target location for the second data, each of the first and second target locations being in the shared memory, wherein the first target location is writeable via a direct path by a first surrogate processing engine of the array of parallel processing engines and the second target location is writeable via a direct path by a second surrogate processing engine of the array of parallel processing engines;
  transferring, in parallel, the first data and the second data from the first and second source locations to the first and second surrogate processing engines, respectively, via an interconnect circuit adapted to deliver data from any location in the shared memory to any one of the processing engines, wherein the interconnect circuit is adapted such that the first data and the second data to be written to the shared memory by the first and second surrogate processing engines, and third data read from the shared memory by a destination processing engine of the array of processing engines, are transferred through at least a portion of the interconnect circuit in a same direction during both read operations and write operations; and
  operating, in parallel, the first and second surrogate processing engines to write the first data and the second data to the first target location and the second target location, respectively.

19. The method of claim 18 wherein the first source processing engine and the second surrogate processing engine are the same processing engine.

20. The method of claim 18 wherein the first source location is a location in a first local register file lane assigned to the first source processing engine and the second source location is a location in a second local register file lane assigned to the second source processing engine.

21. The method of claim 20 wherein transferring the first data and the second data includes:
  delivering the first data from the first source location to a first selection circuit that selects between data from the first local register file lane and data from one of a first subset of locations in the shared memory;
  in parallel with delivering the first data, delivering the second data from the second source location to a second selection circuit that selects between data from the second local register file lane and data from one of a second subset of locations in the shared memory;
  operating the first selection circuit and the second selection circuit in parallel to deliver the first data and the second data to the interconnect circuit; and
  operating the interconnect circuit to deliver the first data to the first surrogate processing engine and the second data to the second surrogate processing engine.

* * * * *